US011765779B2

(12) United States Patent
Ho et al.

(10) Patent No.: US 11,765,779 B2
(45) Date of Patent: Sep. 19, 2023

(54) SECURITY FOR MULTI-LINK OPERATION IN A WIRELESS LOCAL AREA NETWORK (WLAN)

(71) Applicant: QUALCOMM Incorporated, San Diego, CA (US)

(72) Inventors: Sai Yiu Duncan Ho, San Diego, CA (US); George Cherian, San Diego, CA (US); Abhishek Pramod Patil, San Diego, CA (US); Jouni Kalevi Malinen, Tuusula (FI); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 17/033,168

(22) Filed: Sep. 25, 2020

(65) Prior Publication Data
US 2021/0100051 A1 Apr. 1, 2021

Related U.S. Application Data

(60) Provisional application No. 62/906,690, filed on Sep. 26, 2019.

(51) Int. Cl.
*H04L 12/801* (2013.01)
*H04W 12/00* (2021.01)
(Continued)

(52) U.S. Cl.
CPC ............ *H04W 76/15* (2018.02); *H04L 47/34* (2013.01); *H04W 12/033* (2021.01);
(Continued)

(58) Field of Classification Search
CPC ..... H04L 47/34; H04L 63/0428; H04L 63/12; H04L 63/18; H04L 67/14; H04W 12/03;
(Continued)

(56) References Cited

U.S. PATENT DOCUMENTS

| 2013/0217332 A1* | 8/2013 | Altman .................. G01S 1/02 455/3.01 |
| 2015/0089237 A1 | 3/2015 | Kim et al. |

(Continued)

OTHER PUBLICATIONS

International Search Report and Written Opinion—PCT/US2020/052951—ISA/EPO—dated Dec. 1, 2020.

*Primary Examiner* — Melvin C Marcelo
*Assistant Examiner* — Natali Pascual Peguero
(74) *Attorney, Agent, or Firm* — Holland & Hart LLP

(57) ABSTRACT

This disclosure provides methods, devices and systems related multi-link wireless communication. A method may include establishing, between the first WLAN device and a second WLAN device, a multi-link association that enables a first wireless communication link and a second wireless communication link. The method may include determining a temporal key for the multi-link association. The method may include encrypting a first and second media access control (MAC) protocol data unit (MPDU) based on the temporal key. The method may include preparing a first frame including the encrypted first MPDU and a second frame including the encrypted second MPDU. The method may include assigning packet numbers from a set of sequential packet numbers to the first and second frames. The method may include transmitting the first frame over the first wireless communication link and the second frame over the second wireless communication link.

31 Claims, 18 Drawing Sheets

(51) Int. Cl.
    *H04W 12/04*      (2021.01)
    *H04W 72/04*      (2023.01)
    *H04W 76/11*      (2018.01)
    *H04W 76/15*      (2018.01)
    *H04W 80/02*      (2009.01)
    *H04W 84/12*      (2009.01)
    *H04L 47/34*      (2022.01)
    *H04W 72/0446*    (2023.01)
    *H04W 12/033*     (2021.01)

(52) U.S. Cl.
    CPC ....... *H04W 12/04* (2013.01); *H04W 72/0446* (2013.01); *H04W 76/11* (2018.02); *H04W 80/02* (2013.01); *H04W 84/12* (2013.01)

(58) Field of Classification Search
    CPC ............... H04W 12/033; H04W 12/04; H04W 72/0446; H04W 76/11; H04W 76/15; H04W 80/02; H04W 84/12; H04W 76/14
    See application file for complete search history.

(56) References Cited

U.S. PATENT DOCUMENTS

| | | | |
|---|---|---|---|
| 2018/0206174 A1* | 7/2018 | Zhou | H04W 76/15 |
| 2019/0097952 A1* | 3/2019 | Yong | H04W 28/18 |
| 2022/0368481 A1* | 11/2022 | Yang | H04L 1/08 |

* cited by examiner

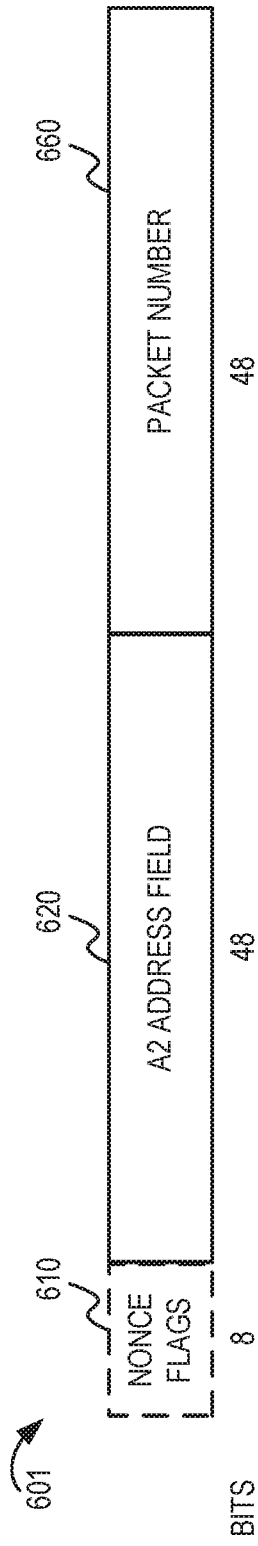
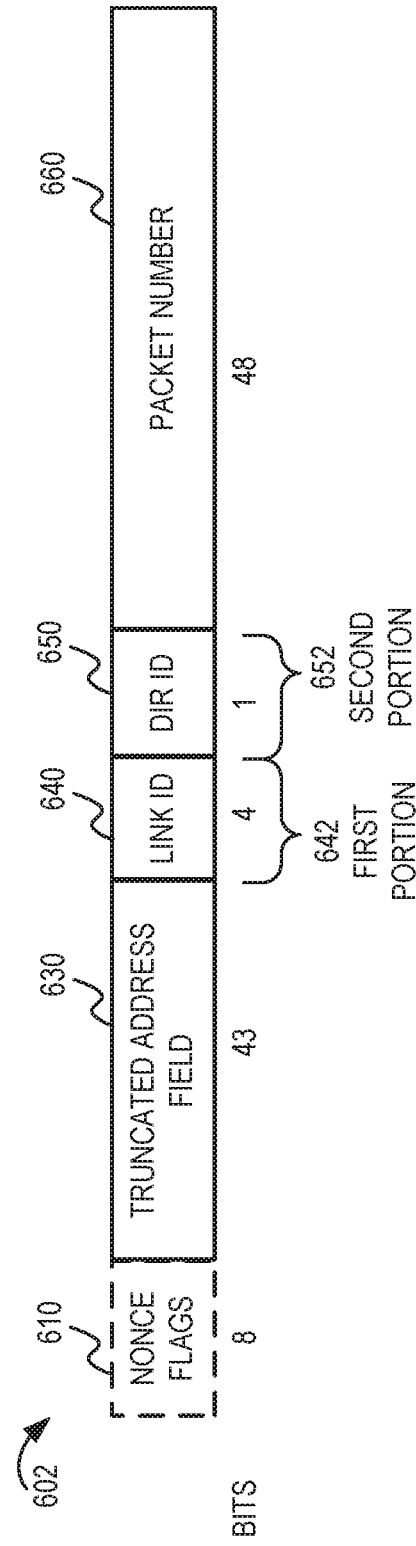

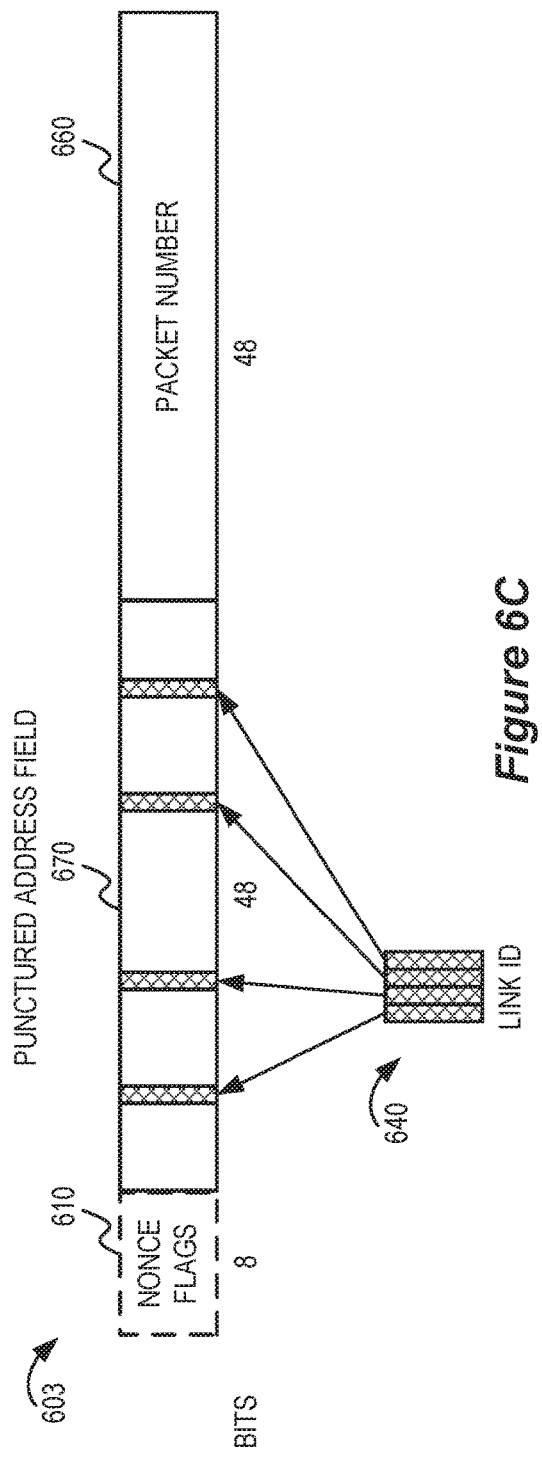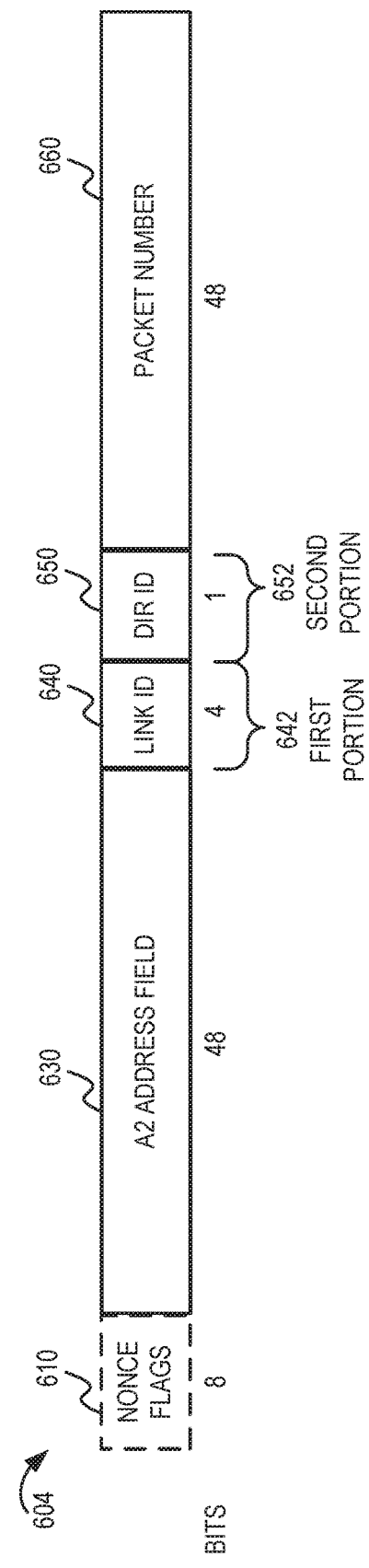

SECURITY FOR MULTI-LINK OPERATION IN A WIRELESS LOCAL AREA NETWORK (WLAN)

CROSS-REFERENCE TO RELATED APPLICATIONS

This patent application claims priority to U.S. Provisional Patent Application No. 62/906,690 filed Sep. 26, 2019, entitled "SECURITY FOR MULTI-LINK OPERATION IN A WIRELESS LOCAL AREA NETWORK (WLAN)," and assigned to the assignee hereof. The disclosure of the prior application is considered part of and is incorporated by reference in this patent application.

TECHNICAL FIELD

This disclosure relates generally to wireless communication, and more specifically, to multi-link operation in a wireless communication system.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

A STA may have a wireless communication link with an AP in response to authenticating with the AP and establishing a wireless session (also referred to as a wireless association, or simply "association") with the AP. Recently, the IEEE is considering new features and new connectivity protocols to improve throughput and reliability. For example, a WLAN communication system may utilize a multi-link operation in which multiple wireless communication links are established between a STA and one or more APs of the WLAN.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication by a first wireless local area network (WLAN) device. The method may include establishing, between the first WLAN device and a second WLAN device, a multi-link association that enables the first WLAN device to exchange frames with the second WLAN device via a first wireless communication link and a second wireless communication link. The method may include determining a temporal key for the multi-link association. The method may include encrypting a first media access control (MAC) protocol data unit (MPDU) based on the temporal key and a second MPDU based on the temporal key. The method may include preparing for transmission a first frame including the encrypted first MPDU and a second frame including the encrypted second MPDU. The method may include assigning a first packet number from a set of sequential packet numbers to the first frame and a second packet number from the set of sequential packet numbers to the second frame. The method may include transmitting the first frame over the first wireless communication link and the second frame over the second wireless communication link.

Another innovative aspect of the subject matter described in this disclosure may be implemented a first WLAN device. The first WLAN device may include at least one modem. The first WLAN device may include at least one processor communicatively coupled with the at least one modem. The first WLAN device may include at least one memory communicatively coupled with the at least one processor and including processor-readable code that, when executed by the at least one processor in conjunction with the at least one modem is configured to perform operations for wireless communication. The processor-readable code may be configured to establish, between the first WLAN device and a second WLAN device, a multi-link association that enables the first WLAN device to exchange frames with the second WLAN device via a first wireless communication link and a second wireless communication link. The processor-readable code may be configured to determine a temporal key for the multi-link association. The processor-readable code may be configured to encrypt a first MPDU via a first temporal key and a second MPDU via a second temporal key. The processor-readable code may be configured to prepare for transmission a first frame including the encrypted first MPDU and a second frame including the encrypted second MPDU. The processor-readable code may be configured to assign a first packet number from a first set of sequential packet numbers to the first frame and a second packet number from a second set of sequential packet numbers to the second frame. The processor-readable code may be configured to transmit the first frame over the first wireless communication link and the second frame over the second wireless communication link.

In some implementations, the method and first WLAN device may be further configured to assign a first sequence number to the first frame and a second sequence number to the second frame, the first sequence number and the second sequence number being from a set of sequence numbers.

In some implementations, the first wireless communication link may be associated with a first link identifier that uniquely identifies the first wireless communication link and the second wireless communication link maybe associated with a second link identifier that uniquely identifies the second wireless communication link.

In some implementations, the method and first WLAN device may be further configured to generate a first nonce that includes the first link identifier and a second nonce that includes the second link identifier. Encryption of the first MPDU may be based on the first nonce and encrypting the second MPDU may be based on the second nonce.

In some implementations, the method and first WLAN device may be further configured to populate a first portion of the first nonce with the first link identifier and populate a second portion of the first nonce with a direction identifier that identifies either an uplink direction or a downlink direction of the first frame.

In some implementations, the method and first WLAN device may be further configured to divide a first address segment of the first nonce to form at least the first portion for the first link identifier and a truncated address segment. The method and first WLAN device may be further configured to truncate an address or a basic service set identifier (BSSID) associated with the first WLAN device. The method and first WLAN device may be further configured to populate the truncated address segment of the first nonce with the truncated address or the truncated BSSID.

In some implementations, a resulting length of the first nonce may be equivalent to an original length of the first nonce before dividing the first address segment, and wherein the first nonce includes the first portion, the truncated address segment, and the second portion.

In some implementations, the truncated address segment may include forty-three bits of the address or the BSSID. The first portion may include four bits to identify the first wireless communication link, and the second portion of the first nonce may include one bit to identify either an uplink direction or a downlink direction of the first frame.

In some implementations, the first nonce may include a first address segment and the second nonce may include a second address segment. The method and first WLAN device may be further configured to populate a first portion of the first address segment with the first link identifier. The method and first WLAN device may be further configured to populate a second portion of the second address segment with the second link identifier.

In some implementations, generation of the first nonce further may include addition of or appending the first link identifier to the first nonce.

In some implementations, the method and first WLAN device may be further configured to determine to retransmit the first frame as a third frame via the second wireless communication link. The method and first WLAN device may be further configured to assign a third packet number from the set of sequential packet numbers to the third frame. The third packet number may be identical to the first packet number of the first frame. The method and first WLAN device may be further configured to transmit the third frame to the second WLAN device via the second wireless communication link.

Another innovative aspect of the subject matter described in this disclosure may be implemented in a method for wireless communication by a first WLAN device. The method may include establishing, between the first WLAN device and a second WLAN device, a multi-link association that enables the first WLAN device to exchange frames with the second WLAN device via a first wireless communication link and a second wireless communication link. The method may include determining a temporal key for the multi-link association. The method may include receiving a first plurality of frames over the first wireless communication link and a second plurality of frames over the second wireless link. Each frame of the first plurality of frames and the second plurality of frames may include an encrypted MPDU and a first packet number selected from a set of sequential packet numbers. The method may include determining, in the first plurality of frames and the second plurality of frames, whether at least two frames include duplicate first packet numbers and whether a frame includes a first packet number that is less than a threshold number. The method may include decrypting the encrypted MPDU in each of the first plurality of frames and the second plurality of frames based on the temporal key for the multi-link association, in response to determining that no two frames include duplicate packet numbers and no frame includes a first packet number that is less than the threshold number.

Another innovative aspect of the subject matter described in this disclosure may be implemented a first WLAN device. The first WLAN device may include at least one modem. The first WLAN device may include at least one processor communicatively coupled with the at least one modem. The first WLAN device may include at least one memory communicatively coupled with the at least one processor and including processor-readable code that, when executed by the at least one processor in conjunction with the at least one modem, control wireless communications. The processor-readable code may be configured to establish, between the first WLAN device and a second WLAN device, a multi-link association that enables the first WLAN device to exchange frames with the second WLAN device via a first wireless communication link and a second wireless communication link. The processor-readable code may be configured to determine a temporal key for the multi-link association. The processor-readable code may be configured to receive a first plurality of frames over the first wireless communication link, and a second plurality of frames over the second wireless link. Each frame of the first plurality of frames and the second plurality of frames may include an encrypted MPDU and a first packet number selected from a set of sequential packet numbers. The processor-readable code may be configured to determine, in the first plurality of frames, whether at least two frames include duplicate first packet numbers and whether a frame includes a first packet number that is less than a threshold number. The processor-readable code may be configured to decrypt the encrypted MPDU in each of the first plurality of frames and the second plurality of frames based on the temporal key for the multi-link association, in response to a determination that no two frames include duplicate packet numbers and no frame includes a first packet number that is less than the threshold number.

In some implementations, the method and first WLAN device may be further configured to discard at least one frame of the two frames that include duplicate first packet numbers, in response to detecting two frames that include duplicate first packet numbers.

In some implementations, the method and first WLAN device may be further configured to discard the frame that includes the first packet number that is less than the threshold number, in response to detecting a frame that includes a first packet number that is less than a threshold number.

In some implementations, each frame of the first plurality of frames and second plurality of frames may include a sequence number selected from a set of sequence numbers. The method and first WLAN device may be further configured to order the first and second pluralities of frames according to the respective sequence number included in each frame of the first and second pluralities of frames.

The method and first WLAN device may be further configured to receive, over the second wireless communication link, a retransmitted frame associated with a frame of the first plurality of frames. The retransmitted frame may include a second packet number identical to the first packet number of the frame of the first plurality of frames.

In some implementations, the retransmitted frame may include an MPDU encrypted based on the temporal key for the multi-link association.

In some implementations, the retransmitted frame may include a first sequence number identical to a second sequence number included in the frame of the first plurality of frames.

In some implementations, the method and first WLAN device may be further configured to generate a first nonce that includes a first link identifier associated with the first wireless communication link and a second nonce that includes a second link identifier associated with the second wireless communication link. In some implementations, decryption of each encrypted MPDU of the first plurality of frames may be further based on the first nonce. In some implementations, decryption of each encrypted MPDU of the second plurality of frames may be further based on the second nonce.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

FIG. 6A shows an example structure of a traditional nonce usable in an encryption or decryption process.

FIG. 6B shows an example structure of a modified nonce usable in an encryption or decryption process according to some implementations.

FIG. 6C shows another example structure of a modified nonce usable in an encryption or decryption process according to some implementations.

FIG. 6D shows another example structure of a modified nonce usable in an encryption or decryption process according to some implementations.

Like reference numbers and designations in the various drawings indicate like elements.

DETAILED DESCRIPTION

Figure 1:
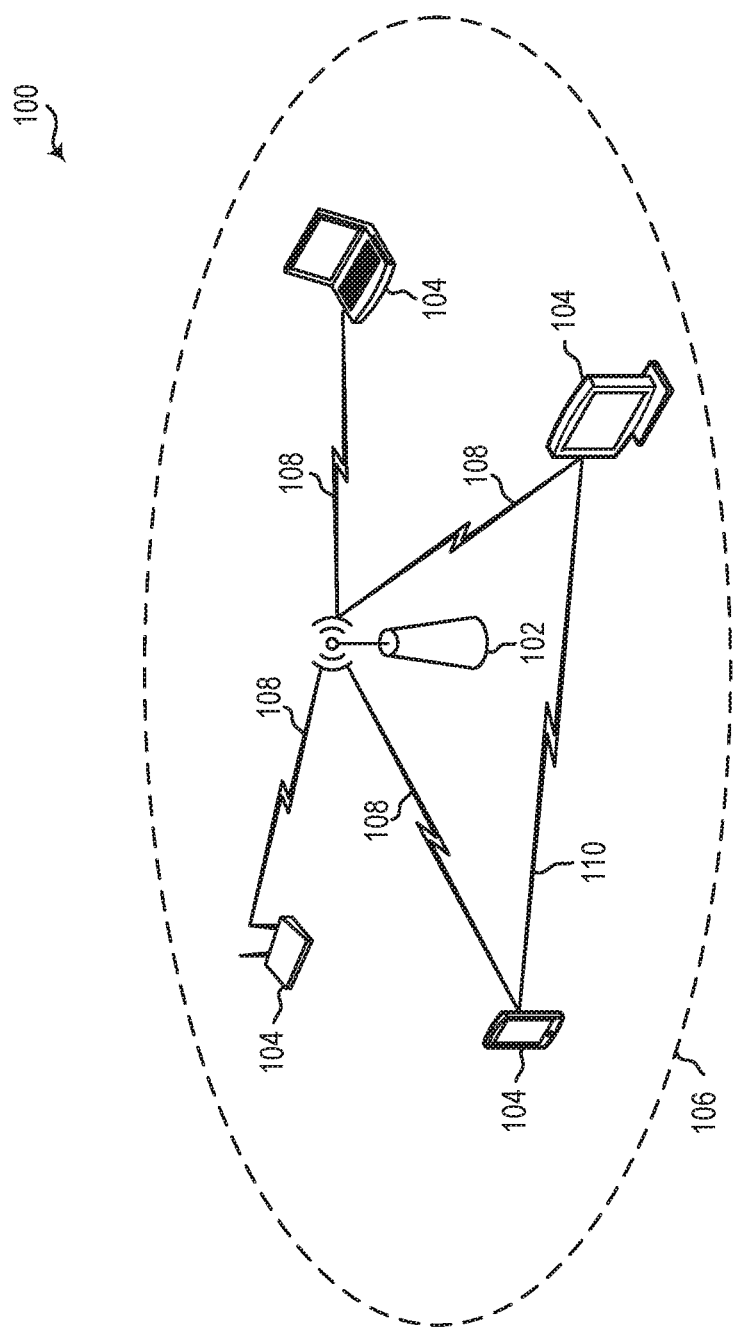
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

A WLAN in a home, apartment, business, or other areas may include one or more WLAN devices. Each WLAN device may have one or more wireless interfaces to communicate via a wireless communication medium with another WLAN device. The wireless communication medium may include one or more wireless channels defined within a wireless frequency band (which may be referred to as a band for simplicity). An access point (AP) is a WLAN device that includes at least one wireless interface as well as a distribution system access function. A station (STA) is a WLAN device that includes at least one wireless interface to communicate with an AP or another STA. Each wireless interface may be an addressable entity that implements wireless communication protocols defined for the WLAN. Recently, the IEEE is defining techniques for multi-link communication in which a WLAN device (such as a STA) may establish concurrent communication links on more than one band or more than one channel in a single band. In some implementation, the concurrent communication links may be established using the same wireless association. The communication links may be established on different channels, frequency bands, or spatial streams, among other examples. In some implementations, a first communication link may be established on a first frequency band (such as 2.4 GHz) while the second communication link may be established on a second frequency band (such as the 5 GHz band or 6 GHz band).

Multi-link communication may enable a STA to experience a better quality of service (QoS) such as higher throughput, reliability, or redundancy, among other examples. For example, multi-link communication may enable multi-link aggregation (MLA) in which multiple communication links can be used to concurrently transmit data. Multi-link operation refers to packet-level or link-level aggregation when one or more APs communicate with a STA (or vice versa) using multiple communication links.

Multi-link communication may also enable retransmission of data using different ones of the communication links. Multi-link operation refers to the use of multiple communication links for aggregation of bandwidth, retransmission diversity, or control plane aggregation. In one example of a multi-link operation, a retransmission of a frame may use a different communication link than was used for an initial transmission of the frame. In a traditional dual connectivity model, each communication link would have a different association identifier and different temporal key for a session. However, in a multi-link operation, the same temporal key may be used for two or more communication links. Furthermore, some mechanisms for protection against replay attacks rely on a packet number (PN) as part of an encryption process. Retransmissions of a frame traditionally include the same PN as the initial transmission. Because multi-link operation typically relies on the same temporal key and the same PN for a retransmission of a frame, the security of the retransmission cannot be uniquely verified and guaranteed. Therefore, improvements to the multi-link communication protocol are needed to maintain security for multi-link operations.

Various implementations of this disclosure relate generally to multi-link operation. A first WLAN device (such as an AP) may establish one or more communication links with a second WLAN device, including at least a first communication link. The first WLAN device may determine that the second WLAN device (such as a STA) has established a second communication link with either the first WLAN device or with a third WLAN device (such as another AP) of the wireless network. When communicating with the second WLAN device, the first WLAN device may modify an encryption process so that an encryption for the initial transmission and an encryption of a retransmission will result in differently encrypted frames even though the source frame (before encryption) may contain the same data and the encryption technique may use the same temporal key, and same PN.

In some implementations, the first WLAN device may generate a nonce based on a first link identifier that identifies the first communication link. For example, unique link identifiers may distinguish each of the communication links from the other communication links. Therefore, the nonces generated for the various links would be different. Because the nonce associated with a communication link is used in the encryption process, the frames for the different communication links would be encrypted differently. The nonce generated by the first WLAN device may be sent to the second WLAN device for use in the decryption process without communicating the nonce directly over the communication link.

In some implementations, the procedure for generating the nonces may be modified to add another order of protection than was previously possible. For example, a nonce may be modified to include a link identifier and a direction identifier. The link identifier may uniquely identify each communication link that is part of a multi-link operation. The direction identifier may be used to indicate whether the frame is being transmitted upstream (from STA to AP) or downstream (from AP to STA). To maintain the same length of the original nonce, in some implementations, an address field of the nonce may be truncated to provide room for the link identifier, the direction identifier, or both. Alternatively, or additionally, the address field may be punctured and the link identifier, the direction identifier, or both, may be stored in punctured locations of the address field. Alternatively, a format of the nonce may be extended so that the link identifier, the direction identifier, or both, may be added or appended to the nonce.

In some implementations of the multi-link operation, different temporal keys and PN spaces may be established for each communication link. In some such implementations, the WLAN devices may generate nonces using traditional processes. In some such implementations, sequence number (SN) may be used to prevent replay attacks. For example, each WLAN interface of a WLAN device may maintain a separate encryption key and PN counter. The SN may be used to re-order the received frames first before examining the corresponding PN values received by the re-ordered frames. In this implementation, the PN values may be strictly increasing for each re-ordered packet. In some implementations that use a separate PN space for each communication link, retransmissions on each of the communication links may use a different set of sequential packet numbers. Alternatively, or additionally, in some implementations, a retransmission of a frame may be transmitted on only the same communication link that was used for the initial transmission of the frame.

Particular implementations of the subject matter described in this disclosure can be implemented to realize one or more of the following potential advantages. The described techniques enable improved security for multi-link communications. The security may be enhanced for multi-link operations without modifying the mathematical calculations used in existing encryption and decryption algorithms. For example, an encryption/decryption protocol based on either counter mode (CTR) with cipher-block chaining message authentication code (CBC-MAC) protocol (CCMP) or Galois/counter mode protocol (GCMP) may continue to use nonces, temporal keys, and PNs for encryption and decryption of frames. In some implementations, the enhanced security may be enabled by manipulating the structure of the nonce without changing the length of the nonce. For example, the length of the nonce may be maintained at an optimal length that supports reduced computational complexity. Thus, in some implementations, the link ID, direction ID, or both may be added to a nonce without changing the length of the nonce so that performance of the encryption/decryption protocol is maintained. Furthermore, because some implementations of the improvements are based on changes to a nonce rather than a temporal key, the same temporal key may be used for multiple communication links, which, in turn, enables fast setup, association, and session establishment for multi-link operation. Additionally, existing CCMP or GCMP algorithms may continue to be used, which may reduce complexity in implementing encryption and decryption, while the inputs to the CCMP or GCMP algorithms—particularly the nonce—may provide unique encryption results depending on which communication link is being used to transmit (or retransmit) a frame.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described below). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2A:
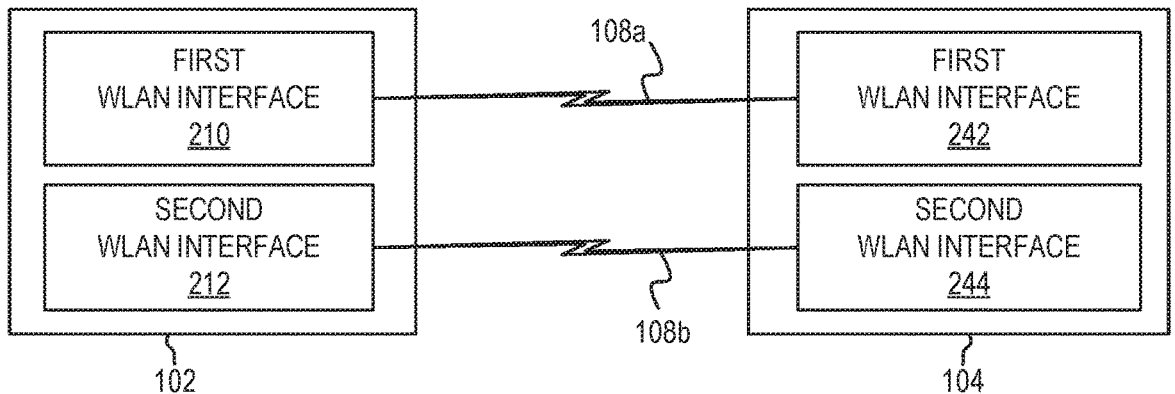
FIG. 2A shows a pictorial diagram of an example system that implements multi-link operation.

FIG. 2A shows a pictorial diagram of an example system 201 that implements multi-link operation. The AP 102 may include multiple wireless interfaces (such as a first WLAN interface 210 and a second WLAN interface 212). Although two WLAN interfaces are shown in the AP 102, there may be a different quantity of WLAN interfaces in various implementations. The STA 104 also may include multiple wireless interfaces (such as a first WLAN interface 242 and a second WLAN interface 244).

The STA 104 may establish multiple communication links (shown as first communication link 108a and second communication link 108b) with the AP 102. For example, the first communication link 108a may be established between the first WLAN interface 242 of the STA 104 and the first WLAN interface 210 of the AP 102. The second communication link 108b may be established between the second WLAN interface 244 of the STA 104 and the second WLAN interface 212 of the AP 102.

Figure 2B:
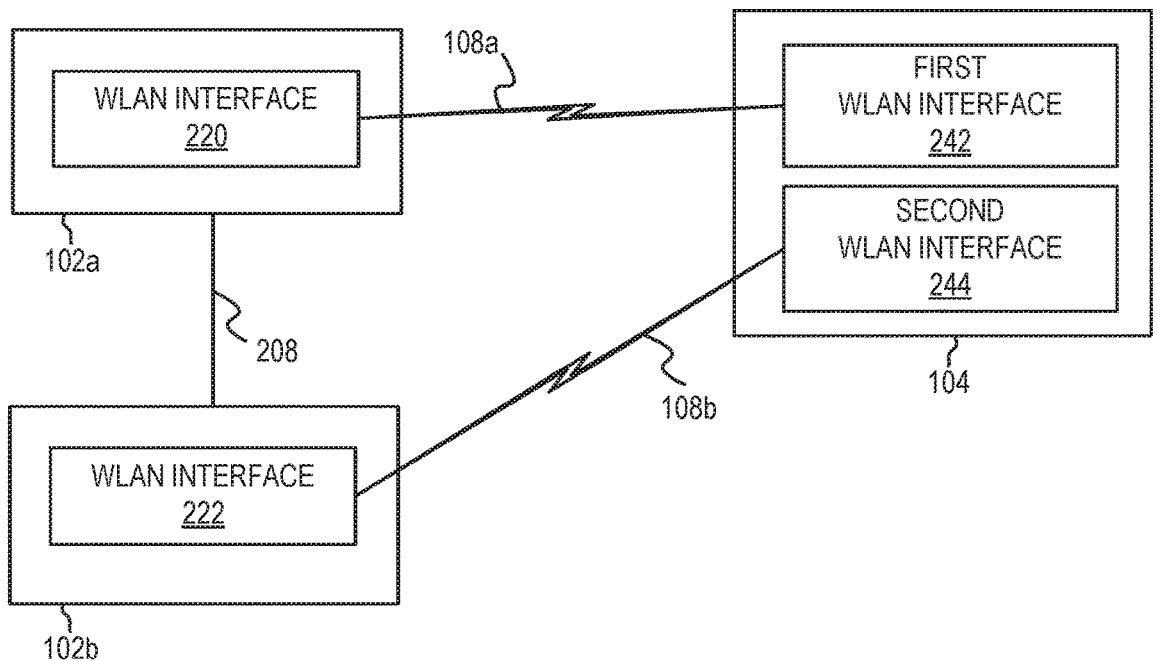
FIG. 2B shows a pictorial diagram of another example system that implements multi-link operation.

FIG. 2B shows a pictorial diagram of another example system 202 that implements multi-link operation. In the second example system 202, the STA 104 may establish multiple communication links 108a and 108b with non-collocated APs 102a and 102b, respectively. For example, the STA 104 may establish a first communication link 108a to a WLAN interface 220 of the AP 102a using the first WLAN interface 242 of the STA 104. The STA 104 may establish a second communication link 108b to a WLAN interface 222 of the AP 102b using the second WLAN interface 244 of the STA 104. The APs 102a and 102b may communicate with each other using a wired or wireless communication link 208. For example, the non-collocated APs 102a and 102b may coordinate multi-link operations for the STA 104 via the wired or wireless communication link 208.

Figure 3A:
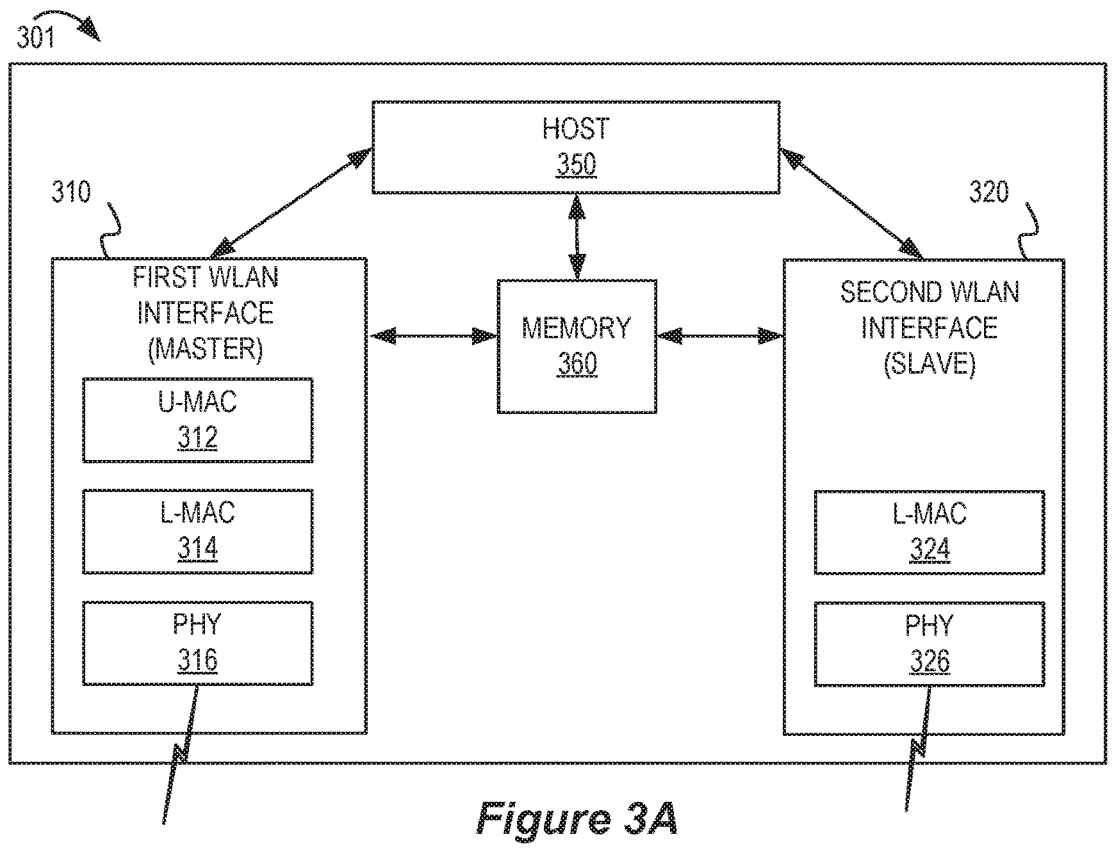
FIG. 3A shows a block diagram of an example wireless local area network (WLAN) device that supports multi-link operation.

FIG. 3A shows a block diagram of an example WLAN device 301 that supports multi-link operation. The WLAN device 301 may be a STA (such as STA 104) or an AP (such any of the APs 102 described herein). The WLAN device 301 includes a first WLAN interface 310 and a second WLAN interface 320. In the example of FIG. 3A, the first WLAN interface 310 acts as a master WLAN interface for a group of WLAN interfaces that includes the first WLAN interface 310 and the second WLAN interface 320. The second WLAN interface 320 may be a slave WLAN interface in the group of WLAN interfaces. A host 350 may operate as a relay to coordinate communication between the first WLAN interface 310 and the second WLAN interface 320. The WLAN device 301 may include memory 360 which is accessible and used by both the first WLAN interface 310 and the second WLAN interface 320 to store or retrieve buffered frames or packets.

The first WLAN interface 310 may include a master MAC layer (also referred to as an upper MAC (U-MAC) 312), which has a corresponding network MAC address. The first WLAN interface 310 also includes a lower MAC layer (L-MAC 314, also referred to as a link MAC layer) and a PHY layer 316. The second WLAN interface 320 includes a lower MAC layer (L-MAC 324) and a PHY layer 326. Each WLAN interface 310 and 320 may be configured to establish a communication link with one or more other WLAN devices (not shown). The U-MAC 312 may coordinate which lower MAC (L-MAC 314 or L-MAC 324) will transmit or receive frames during multi-link operation. The U-MAC 312 also may coordinate retransmissions or acknowledgements via the L-MAC 314 or the L-MAC 324 on behalf of the WLAN device 301. The frames (which also may be referred to as MAC protocol data units, or MPDUs) may include one or more MAC service data units (MSDUs). Each MSDU may include data from or to the host 350. The U-MAC 312 may determine encryption settings, addressing fields, or other parameters for each MPDU.

Figure 3B:
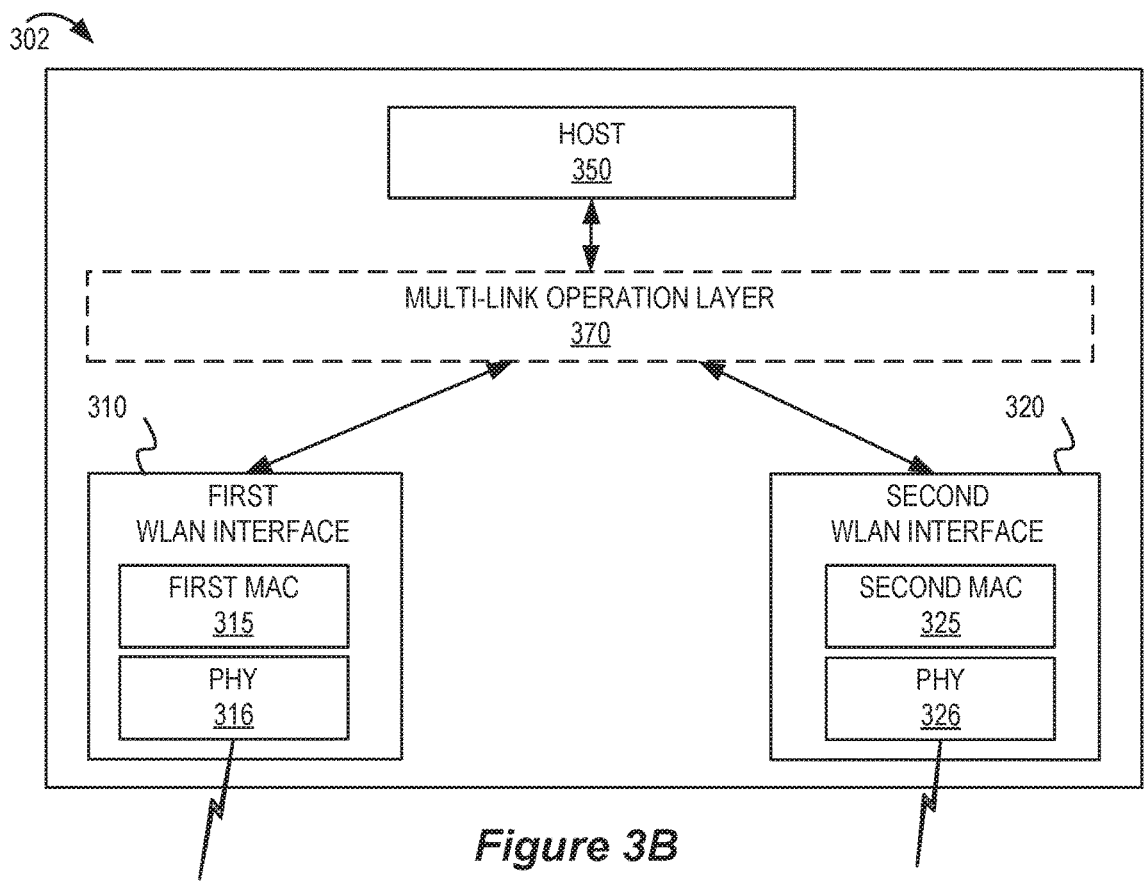
FIG. 3B shows a block diagram of another example WLAN device that supports multi-link operation.

FIG. 3B shows a block diagram of another example WLAN device 302 that supports multi-link operation. The WLAN device 302 may be a STA (such as STA 104) or an AP (such any of the APs 102 described herein). The WLAN device 302 includes a first WLAN interface 310, a second WLAN interface 320, and a host 350. The first WLAN interface 310 includes a first MAC layer 315 and a PHY layer 316. The second WLAN interface 320 includes a second MAC layer 325 and a PHY layer 326. Furthermore, the WLAN device 302 includes a multi-link operation layer 370. In some implementations, the multi-link operation layer 370 may be implemented in the first WLAN interface 310, the second WLAN interface 320, or the host 350. Collectively, the first WLAN interface 310, the second WLAN interface 320, and the multi-link operation layer 370 may be referred to as a multi-link layer entity (MLLE) or a multi-layer logical entity. The multi-link operation layer 370 may provide a MAC service access point (MAC-SAP) that maintains a common association context (including security settings) and a common acknowledgement scheme that is used by both the first WLAN interface 310 and the second WLAN interface 320.

Figure 4:
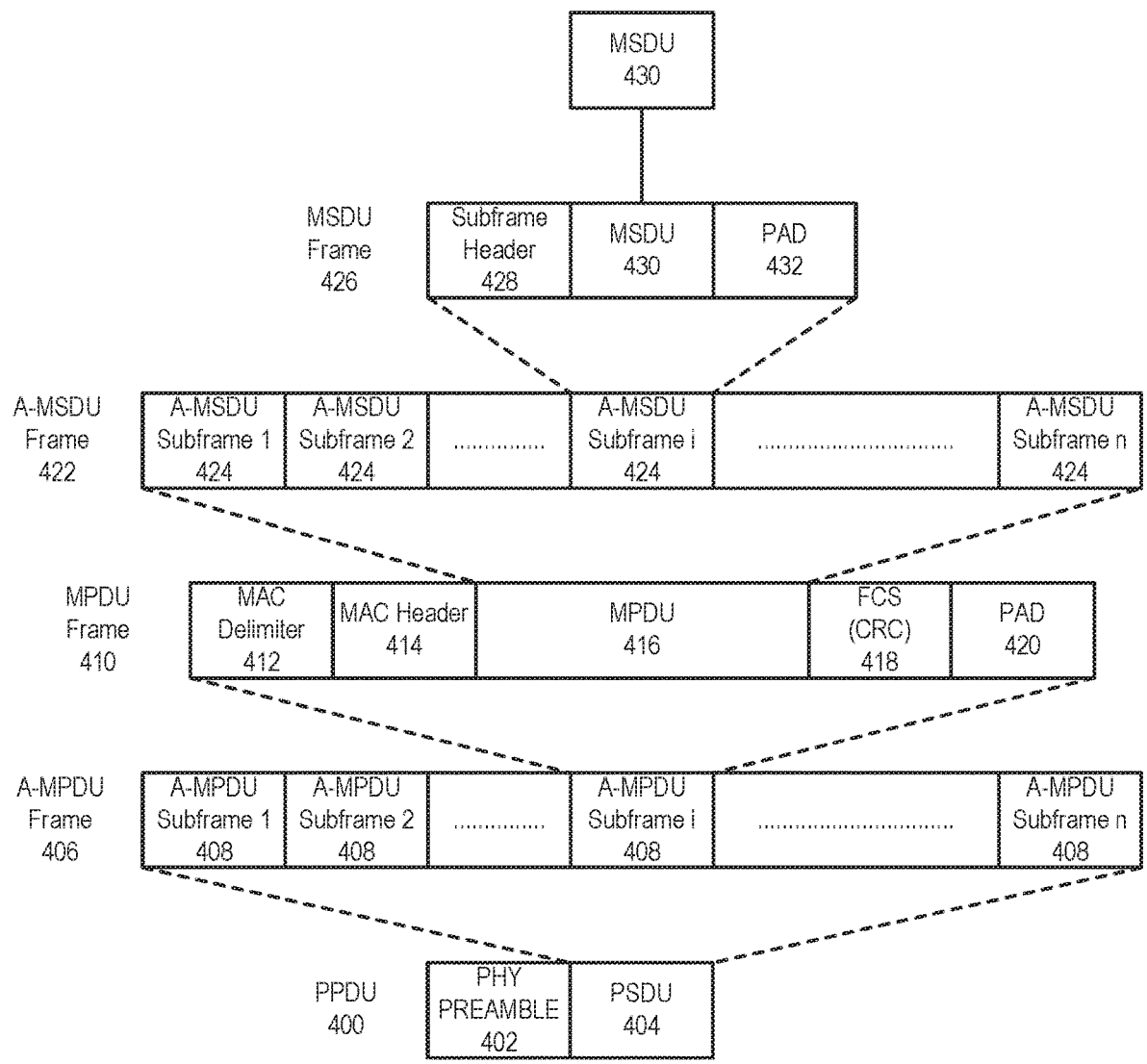
FIG. 4 shows an example of a physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 408 may include an MPDU frame 410 that includes a MAC delimiter 412 and a MAC header 414 prior to the accompanying MPDU 416, which comprises the data portion ("payload" or "frame body") of the MPDU frame 410. Each MPDU frame 410 may also include a frame check sequence (FCS) field 418 for error detection (for example, the FCS field may include a cyclic redundancy check (CRC)) and padding bits 420. The MPDU 416 may carry one or more MAC service data units (MSDUs) 426. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include a number of fields containing information that defines or indicates characteristics or attributes of data encapsulated within the MPDU 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration and enables the receiving device to establish its network allocation vector (NAV). The MAC header 414 also includes a number of fields indicating addresses for the data encapsulated within the MPDU 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

A WLAN may use cryptographic encapsulation mechanisms to protect data and to detect or mitigate replay attacks. Example cryptographic encapsulation mechanisms include CCMP and GCMP. These protocols use temporal keys generated for each session. In some implementations of multi-link operation described herein, the temporal key may be common for the multiple communication links.

In various implementations, the cryptographic encapsulation mechanisms utilize a unique nonce for each MPDU protected by the temporal key. The nonce is generated based in part on an address from the MAC header of the MPDU as well as a packet number (PN). The PN is sequentially incremented for each MPDU. If a receiving WLAN device determines that either a PN or the temporal key has been reused, the security status of the MPDU may be voided and the WLAN device may discard the frame.

Figure 5A:
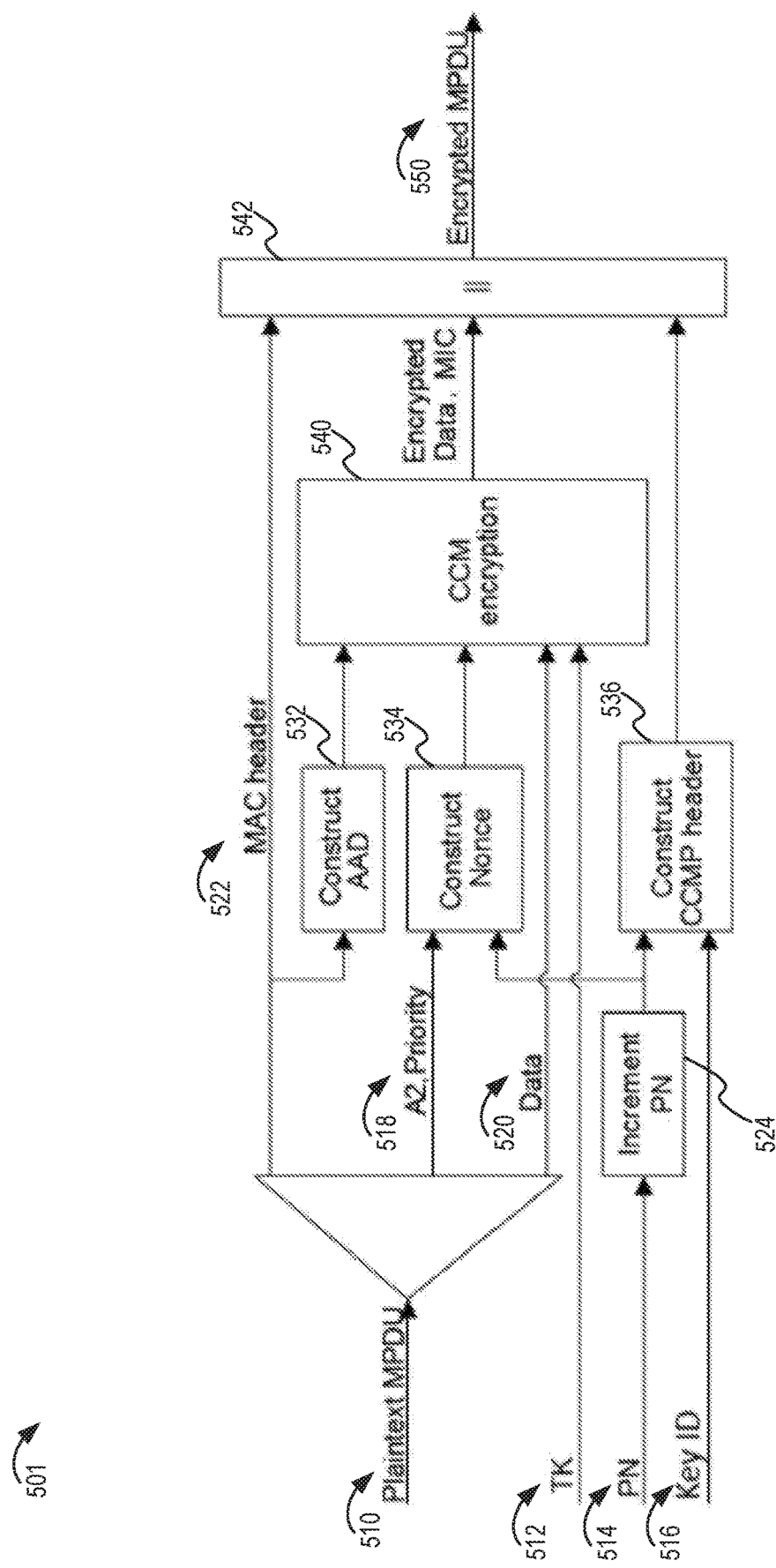
FIG. 5A shows a block diagram of an example encryption process according to some implementations.

FIG. 5A shows a block diagram of an example encryption process 501 according to some implementations. The example encryption process 501 is based on CCMP encryption. The example encryption process 501 may be performed by an AP (such as AP 102) or a STA (such as STA 104) that is transmitting an MPDU. A plaintext (unencrypted) MPDU 510 may be parsed to determine some of the inputs into a CTR with CBC-MAC (CCM) encryption module (which performs a CCM algorithm) 540. For example, some of the fields from the MAC header 522 of the plaintext MPDU 510 may be parsed to provide to an additional authentication data (AAD) generator 532 for the determination of AAD. The CCM encryption module 540 provides integrity protection for the fields included in the AAD. A PN incrementor 524 may then increment a packet number 514 from the previous MPDU to determine the next PN that will be used to construct a nonce. Note that retransmitted MPDUs may not be modified on retransmission. Therefore, the same PN used for an initial transmission of an MPDU may be used as the PN for the retransmission of that MPDU. The PN values sequentially number each MPDU. Each WLAN device maintains a single PN counter (such as a 48-bit counter) for each secure association with another WLAN device. In some implementations, the PN is a 48-bit increasing integer, initialized to 1 when the corresponding temporal key is initialized or refreshed.

The nonce generator 534 may generate the CCM nonce using the PN, an address field value (A2 address) from the MAC header, and a priority value of the MPDU. The priority value may be based on a quality of service indicator or access category indicator. In some implementations, the PN from the PN incrementer 524 and a key identifier also may be sent to a CCMP header generator that constructs a CCMP header for the encrypted MPDU.

The CCM encryption module 540 uses the temporal key 512, the AAD, the nonce, and MPDU data 520 to form the encrypted data (in the form of cipher text) and a message integrity code (MIC). The CCM encryption process may also be referred to as CCM originator processing. The MIC is a value generated by the cryptographic function. If the input data are changed, a new value cannot be correctly computed without knowledge of the cryptographic key(s) used by the cryptographic function. The MIC also may be referred to as a message authentication code. The original MAC header 522, the CCMP header (if included), the encrypted data, and the MIC are combined at block 542 to form the encrypted MPDU 550.

The GCMP encryption process (not shown) is similar to the CCMP encryption process described with reference to FIG. 5A, except that the GCMP process does not use a priority value as an input to the nonce generator 534.

Figure 5B:
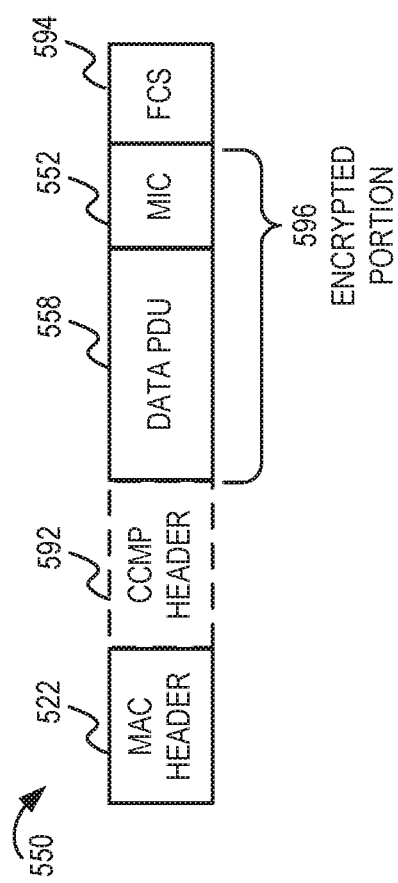
FIG. 5B shows a structure of a media access control (MAC) protocol data unit (MPDU) that has been encrypted using the process of FIG. 5A according to some implementations.

FIG. 5B shows a structure of an MPDU 550 that has been encrypted using the process of FIG. 5A according to some implementations. The encrypted MPDU 550 includes the MAC header 522, the CCMP header 592, the data PDU 558 (encrypted), the MIC 552, and a frame check sequence (FCS) 594. The data PDU 558 and the MIC 552 are the encrypted portion 596 of the encrypted MPDU 550. The MAC header 522 and the CCMP header 592 (when included) provide some values (such as the A2 address in the MAC header 522 and the PN in the CCMP header 592) which can be used by a receiving WLAN device to decrypt the encrypted portion 596. In some implementations, the CCMP header 592 may be omitted. For example, if a frame control field of the MAC header 522 indicates that the encrypted MPDU 550 is using a first protocol version (PV1), the CCMP header 592 may be omitted. If the CCMP header 592 is omitted, the PN may be determined by a local counter. The transmitting WLAN device and the receiving WLAN device may both maintain a local counter so that they have the same PN for each MPDU. The CCMP header 592 may be included to initialize the local counters or to establish a new PN.

Figure 5C:
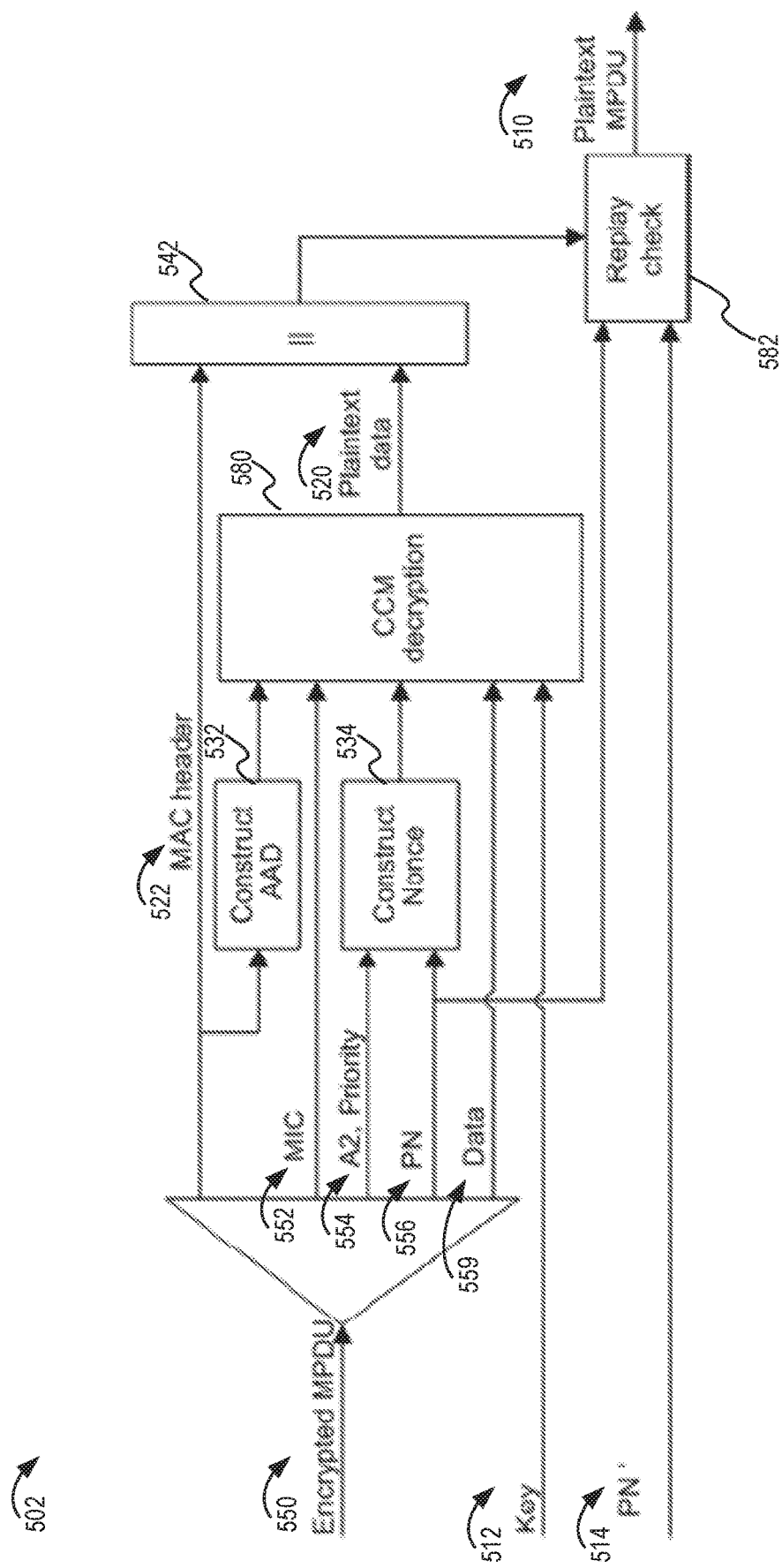
FIG. 5C shows a block diagram of an example decryption process according to some implementations.

FIG. 5C shows a block diagram of an example decryption process 502 according to some implementations. The example decryption process 502 may be performed by an AP (such as AP 102) or a STA (such as STA 104) that is receiving an encrypted MPDU 550. The MAC header 522 of the encrypted MPDU 550 is parsed to provide an AAD generator 532 for the determination of AAD. The unencrypted portion of the encrypted MPDU 550 may be parsed to determine an A2 address field 554, priority value, and PN 556. In some implementations, the PN 556 may be included in a CCMP header or other unencrypted portion of the encrypted MPDU 550. Alternatively the PN 556 may not be included with the encrypted MPDU 550 and the PN 556 may be determined by incrementing a PN local counter (not shown) associated with the session. If the PN determined from the PN local counter is different from the PN that was used by the transmitting WLAN device, then the CCM decryption module 580 will fail to properly decrypt the cipher text data 559. The A2 address field 554, the priority value, and the PN 556 are passed to a nonce generator 534 that constructs the nonce. The MIC may be extracted from the encrypted MPDU 550 for use with the CCM decryption module 580. The MIC may be used for CCM integrity checking by the CCM decryption module 580. The CCM decryption module 580 performs CCM recipient processing to decrypt the cipher text data 559 (to recover plaintext data) using the temporal key 512 (retrieved from memory), the AAD, the nonce, and the MIC. The CCM recipient processing also checks the integrity of the AAD and MPDU plaintext data using the MIC 552. The MAC header 522 and the plaintext data 520 may be concatenated to form a plaintext MPDU 510.

The decryption processing prevents replay of MPDUs by validating that the PN in the MPDU is greater than the replay counter maintained for the session. A replay check module 582 compares the PN 556 with the previously stored packet number (PN') value 514.

FIG. 6A shows an example structure of a traditional nonce usable in an encryption or decryption process. The traditional nonce 601 (which is based on traditional techniques) may include nonce flags 610, an A2 address segment 620, and a PN 660. The A2 address segment 620 may be populated with a 6 octet (48 bit) address, association ID (AID), or BSSID that represents a transmitting side of the MPDU. The nonce flags 610 may include one or more indicators (not shown), such as a priority flag, a management segment, a protocol version segment, among other examples. However, because the A2 address segment may be the same for multiple communication links, and the PN 660 is mandated to equal the PN (not shown) used for an initial transmission, there is a possibility of resulting in the same nonce value for the traditional nonce 601. Using the same nonce value for a retransmission or for an encryption of a different set of data is a security flaw that compromises the security for subsequent transmissions or retransmissions in a multi-link operation.

FIG. 6B shows an example structure of a modified nonce 602 usable in an encryption or decryption process according to some implementations. The modified nonce 602 includes a link identifier (ID) 640 that uniquely identifies each communication link associated with the multi-link operation. The link ID 640 may be included in a first portion 642 of the modified nonce 602. In some implementations, the modified nonce 602 also may include a direction ID 650 in a second portion 652 of the modified nonce 602. Both the transmitting WLAN device and the receiving WLAN device may generate the same nonce because they are both aware of the Link ID 640 for the communication links and the Direction ID 650 based on their association relationship. In this example, the temporal key and the PN may be the same for retransmissions of the same frame via any of the communication links that are used for the multi-link operation.

In some implementations, the length of the modified nonce 602 may be the same as the length of the traditional nonce 601. To make room for the first portion 642 and the second portion 652, the A2 address segment 620 may be modified. For example, the A2 address segment may be truncated to form a truncated address segment 630. For example, a WLAN device may reduce the A2 address segment from forty-eight bits to forty-three bits so that five bits can be used for the first and second portions 642 and 652. In some implementations, the first portion 642 may be four bits and the second portion 652 may be one bit. A first value for the direction ID 650 may be represent an upstream direction and a second value for the direction ID 650 may represent a downstream direction, or vice versa. The link ID 640 may be a value that is sequentially unique for each communication link. Alternatively, the link ID 640 may be a random value that is verified to be unique from among all the link IDs being used for a multi-link operation. A first WLAN device may communicate a link ID 640 for one or more communication links at the time of association or session setup. For example, the link ID may be communicated or generated at approximately the same time that the temporal key is generated.

A WLAN device may populate the truncated address segment 630 with part of the A2 address segment 620. For example, the part of the A2 address segment 620 may include the most significant bits (MSBs), the least significant bits (LSBs), a consecutive string of middle bits, or a predetermined selection of specified bits. Each WLAN device (transmitting WLAN device and receiving WLAN device) may be configured to use the same procedure for generating the truncated address segment 630.

FIG. 6C shows another example structure of a modified nonce 603 usable in an encryption or decryption process according to some implementations. In some implementations, the length of the modified nonce 603 may be the same as the length of the traditional nonce 601. To make room for additional nonce data (such as a link ID 640, direction ID (not shown), or other nonce data), the A2 address segment may be punctured to form a punctured address segment 670. For example, a WLAN device may reduce the A2 address segment from forty-eight bits to forty-three bits so that five bits can be used for the additional nonce data. A WLAN device may populate unpunctured bits of the punctured address segment 670 with part of the A2 address segment. For example, the part of the A2 address segment may include predetermined selection of specified bits from the A2 address. A WLAN device may populate punctured bits of the punctured address segment 670 with additional nonce data (such as the link ID 640) as shown in FIG. 6C. Each WLAN device (transmitting WLAN device and receiving WLAN device) may be configured to use the same procedure for generating the punctured address segment 670.

FIG. 6D shows another example structure of a modified nonce 604 usable in an encryption or decryption process according to some implementations. In FIG. 6D, the modified nonce 604 includes the nonce flags 610, the A2 address segment 630 and the PN 660 as described above with reference to FIG. 6A. A length of the modified nonce 604 is extended so that additional nonce data (such as the link ID 640 and the direction ID 650) may be added or appended. In FIG. 6D, the link ID 640 is added in a first portion 642 and the direction ID 650 is added in a second portion 652 of the modified nonce 604. The first portion 642 and the second portion 652 may be added between the address segment 630 and the PN 660. In other implementations, the first portion 642, the second portion 652, or both may be located in different locations of the modified nonce 604, such as at the beginning or end.

Figure 7A:
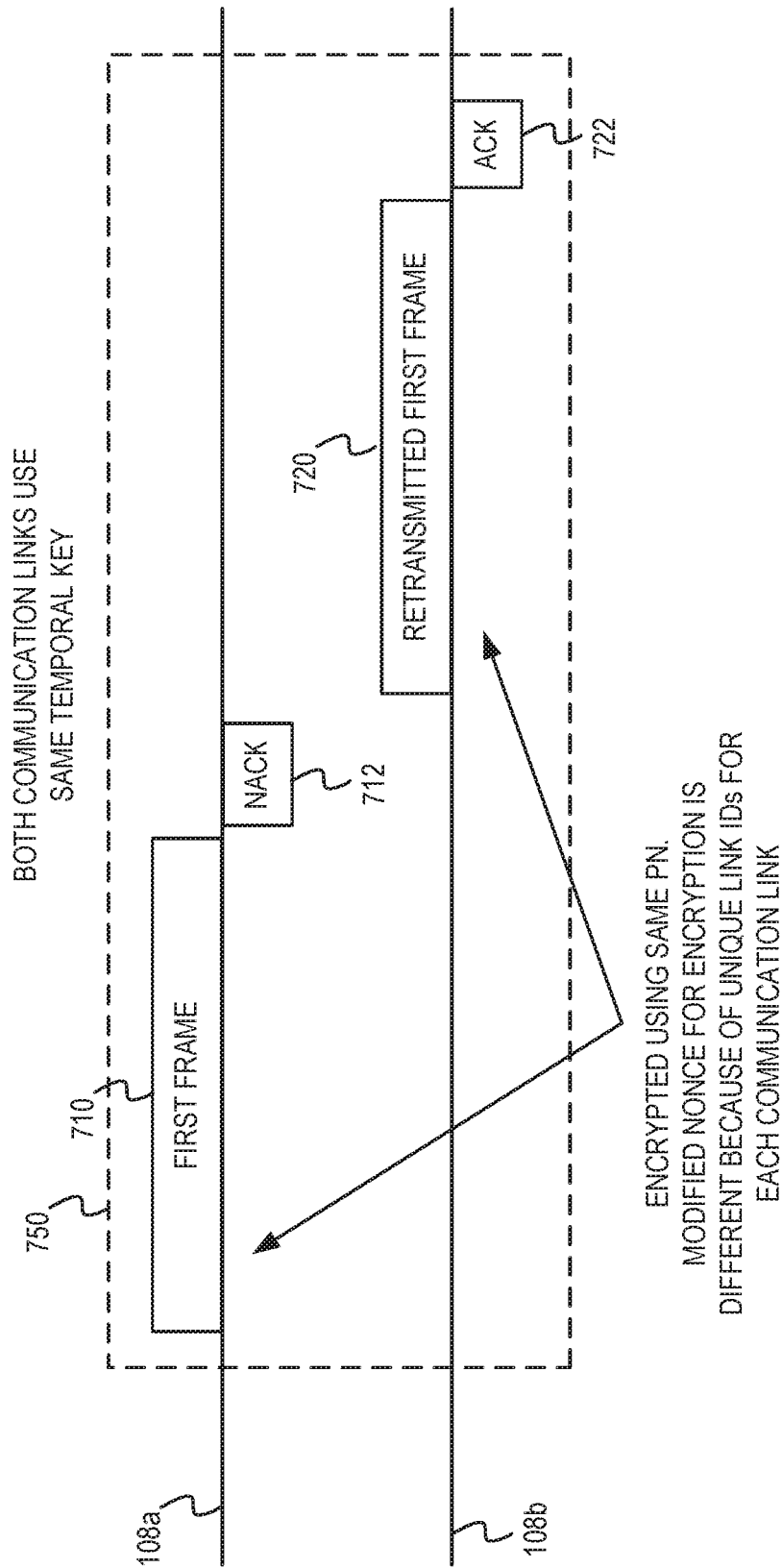
FIG. 7A shows a timing diagram in which an MPDU may be retransmitted using a modified nonce in a multi-link operation according to some implementations.

FIG. 7A shows a timing diagram in which an MPDU may be retransmitted using a modified nonce in a multi-link operation according to some implementations. A first WLAN device (not shown) and a second WLAN device (not shown) may have multiple communication links 108a and 108b, as described with reference to FIG. 2A. Alternatively, the first communication link 108a and the second communication link 108b may be established between a STA and two different APs, as described with reference to FIG. 2B. The WLAN devices may use a same temporal key for both of the communication links 108a and 108b. Similarly, the WLAN devices may use a same PN space and may maintain PN counters that are responsive to frames transmitted or received via both of the communication links 108a and 108b.

The first WLAN device may encrypt an MPDU to form a first frame 710. The encryption may be based on the temporal key, PN, and a modified nonce that includes a first link ID that uniquely identifies the first communication link 108a from among all the communication links 108a and 108b used in the multi-link operation. The first WLAN device may transmit the first frame 710 as an initial transmission on a first communication link 108a. If the second WLAN device fails to decrypt or decode the first frame 710, the second WLAN device may transmit a negative acknowledgement (NACK) 712 back to the first WLAN device. The first WLAN device may determine to retransmit the MPDU via the second communication link 108b. However, the first WLAN device may modify the nonce used for the encryption by including a second link ID that uniquely identifies the second communication link 108b from among all the communication links 108a and 108b used in the multi-link operation. Thus, the first WLAN device will obtain a different encryption result for the MPDU and will transmit the different encryption result as the retransmitted first frame 720. After receiving and processing the retransmitted first frame 720, the second WLAN device may respond with a positive acknowledgement (ACK) 722.

Figure 7B:
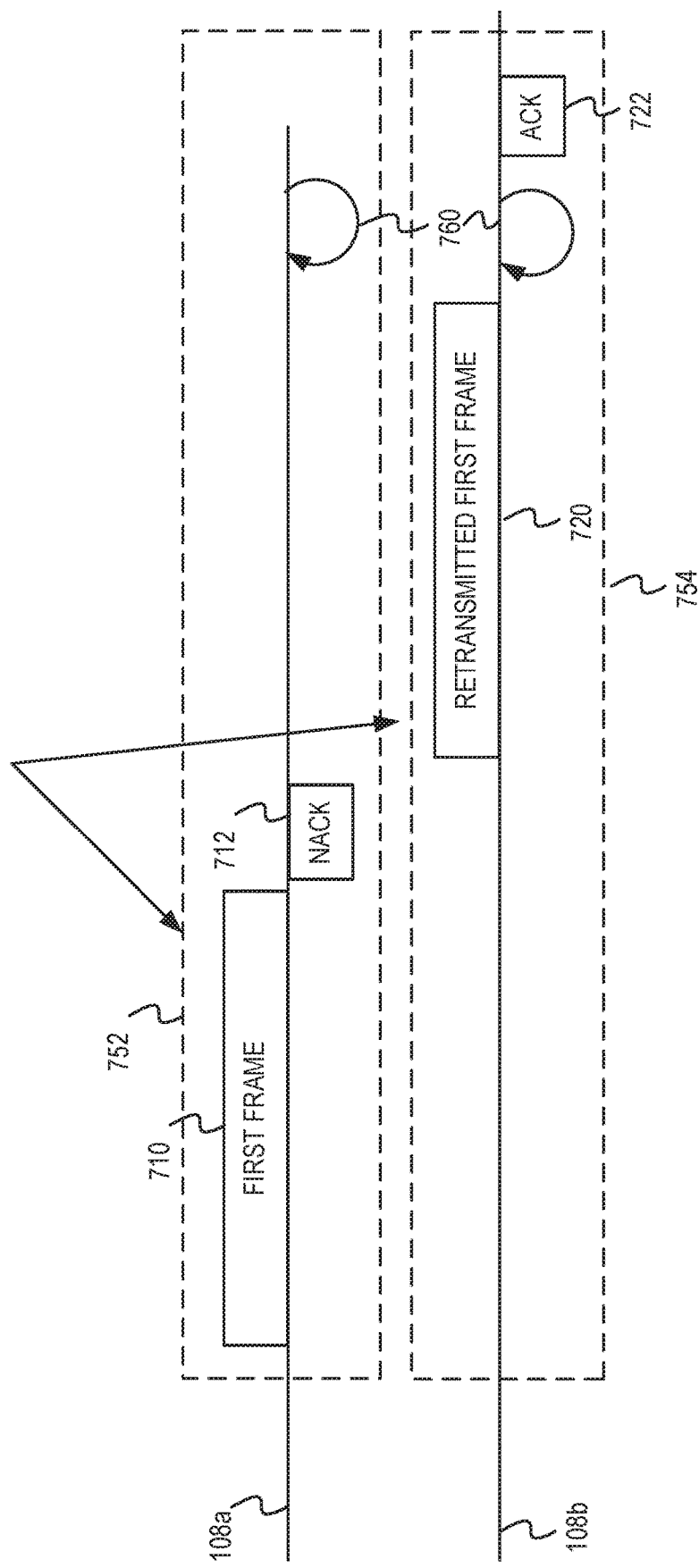
FIG. 7B shows a timing diagram in which an MPDU may be retransmitted using separate temporal keys and packet number counters in a multi-link operation according to some implementations.

FIG. 7B shows a timing diagram in which an MPDU may be retransmitted using separate temporal keys and packet number counters in a multi-link operation according to some implementations. Similar to FIG. 7A, a first WLAN device and a second WLAN device may have a plurality of communication links including a first communication link 108a and a second communication link 108b. However, different from FIG. 7A, the WLAN devices may establish different temporal keys and PN space for each communication link. For example, the first WLAN device may determine a first temporal key for the first communication link 108a and may sequentially number packets based on a first PN counter that is specific to the first communication link 108a. The first temporal key and first PN counter may form a first encryption configuration 752 for the first communication link 108a. The first WLAN device may determine a second temporal key (different from the first temporal key) for the second communication link 108b and may sequentially number packets using a second PN counter (different from the first PN counter) that is specific to the second communication link 108b. The second temporal key and second PN counter may form a second encryption configuration 754 for the second communication link 108b. Therefore, the WLAN devices may manage different encryption configurations for each of the communication links 108a and 108b.

The first WLAN device may transmit a first frame 710 via the first communication link 108a. As with FIG. 7A, the second WLAN device may transmit a NACK 712 to indicate that the second WLAN device was unable to decode or decrypt the first frame 710. The first WLAN device may transmit a retransmitted first frame 720 via the second communication link 108b. Because the second encryption configuration 754 is different than the first encryption configuration 752, the first WLAN device may not include a link ID or direction ID in the nonce when performing an encryption of the retransmitted first frame 720. Rather, the different temporal key and PN space will suffice to create a different encryption result.

Each WLAN interface (for communication links 108a and 108b) of the second WLAN device has a different encryption configuration 752 and 754 including different PN counters. Therefore, the PN may be insufficient to detect packet replay or guarantee security of the encrypted MPDU. Instead, the second WLAN device may perform a SN packet replay procedure 760 to protect from a packet replay security breach. The SN packet replay procedure 760 may be performed by a master WLAN interface or at a higher layer of the second WLAN device. The second WLAN device (using the master WLAN interface or a higher layer) may re-order the frames (coming from different communication links) based on their SN. Since each communication link has its own PN space, the second WLAN device compares the received PN value of a frame only with the last PN value received from that same communication link and makes sure the PN values from the packets arrived on the same communication link are increasing. If a PN for a particular communication link is repeated or less than a previous PN for that communication link, the second WLAN device may determine that there has been a packet replay security breach. In response to the packet replay security breach, the second WLAN device may discard the transmission and may establish new temporal keys and reset the PN counter for each communication link 108a and 108b. Alternatively, if the PN for each communication link increase properly according to the rule (such as strictly increasing by a fixed value), the second WLAN device may determine that there is no packet replay security breach and may respond with a positive acknowledgement 722.

Figure 8:
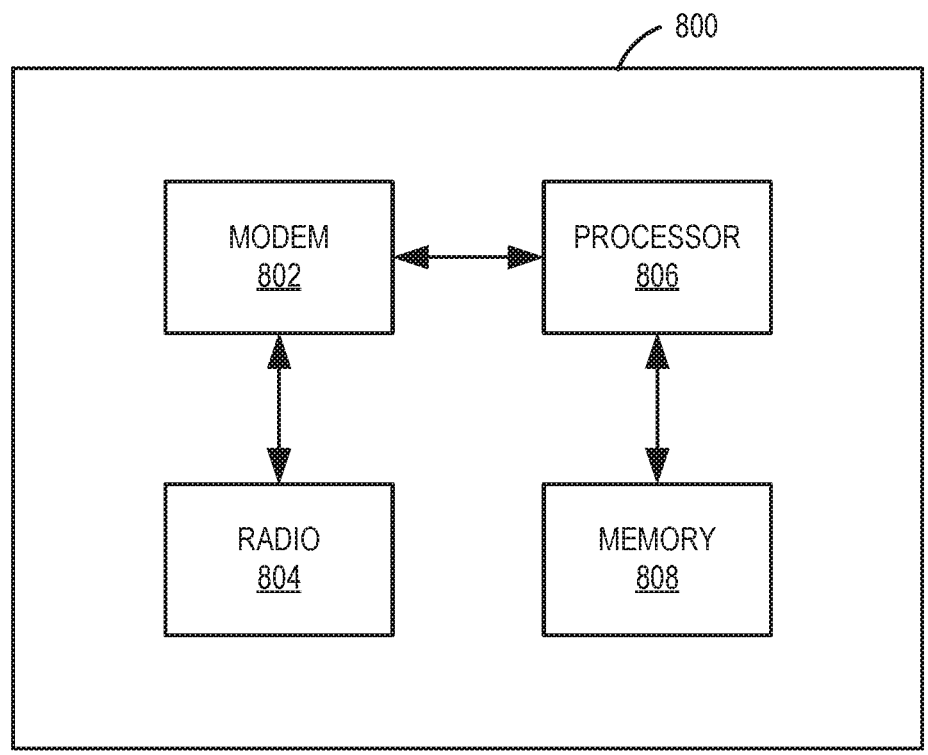
FIG. 8 shows a block diagram of an example wireless communication device.

FIG. 8 shows a block diagram of an example wireless communication device 800. In some implementations, the wireless communication device 800 can be an example of a device for use in a STA such as one of the STAs 104 described above with reference to FIG. 1. In some implementations, the wireless communication device 800 can be an example of a device for use in an AP such as the AP 102 described above with reference to FIG. 1. The wireless communication device 800 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 800 can be, or can include, a chip, system on chip (SoC), chipset, package or device that includes one or more modems 802, for example, a Wi-Fi (IEEE 802.11 compliant) modem. In some implementations, the one or more modems 802 (collectively "the modem 802") additionally include a WWAN modem (for example, a 3GPP 4G LTE or 5G compliant modem). In some implementations, the wireless communication device 800 also includes one or more radios 804 (collectively "the radio 804"). In some implementations, the wireless communication device 800 further includes one or more processors, processing blocks or processing elements 806 (collectively "the processor 806") and one or more memory blocks or elements 808 (collectively "the memory 808").

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 806) for processing, evaluation or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 800 can include, or be coupled with, multiple transmit antennas (each with a corresponding transmit chain) and multiple receive antennas (each with a corresponding receive chain). The symbols output from the modem 802 are provided to the radio 804, which then transmits the symbols via the coupled antennas. Similarly, symbols received via the antennas are obtained by the radio 804, which then provides the symbols to the modem 802.

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 806 may generally control the modem 802 to cause the modem to perform various operations described above.

The memory 808 can include tangible storage media such as random-access memory (RAM) or read-only memory (ROM), or combinations thereof. The memory 808 also can store non-transitory processor- or computer-executable software (SW) code containing instructions that, when executed by the processor 806, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 9B:
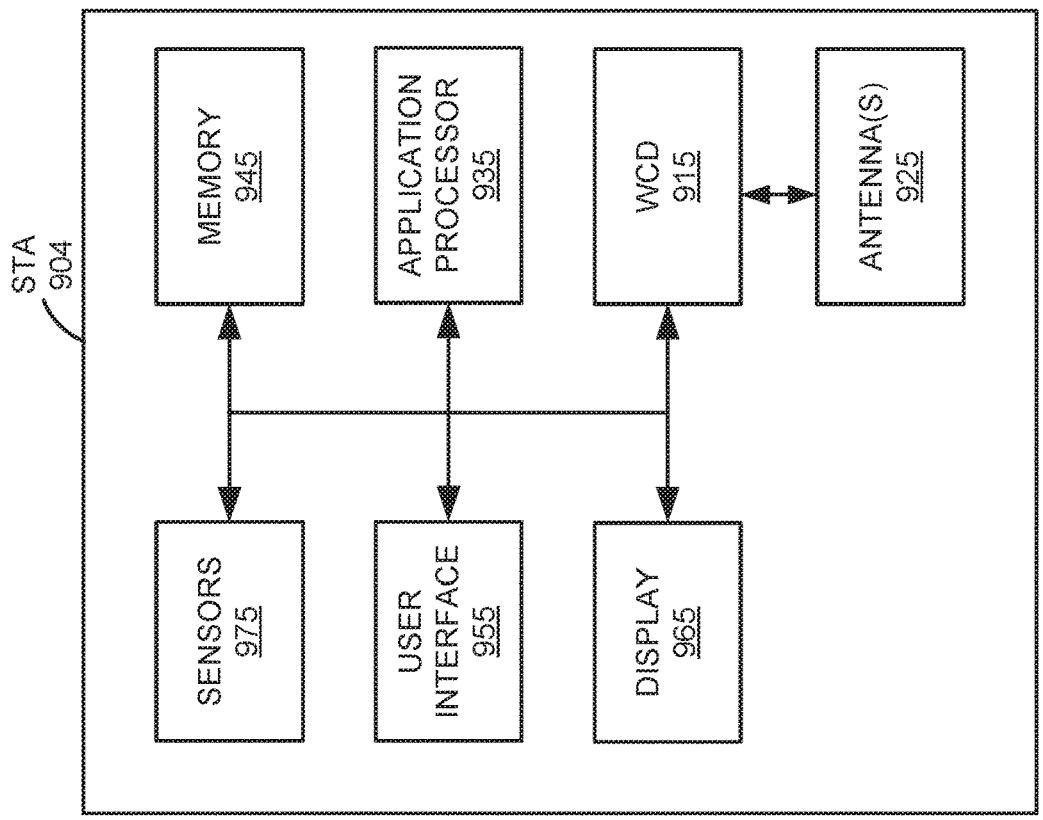
FIG. 9B shows a block diagram of an example STA.
Figure 9A:
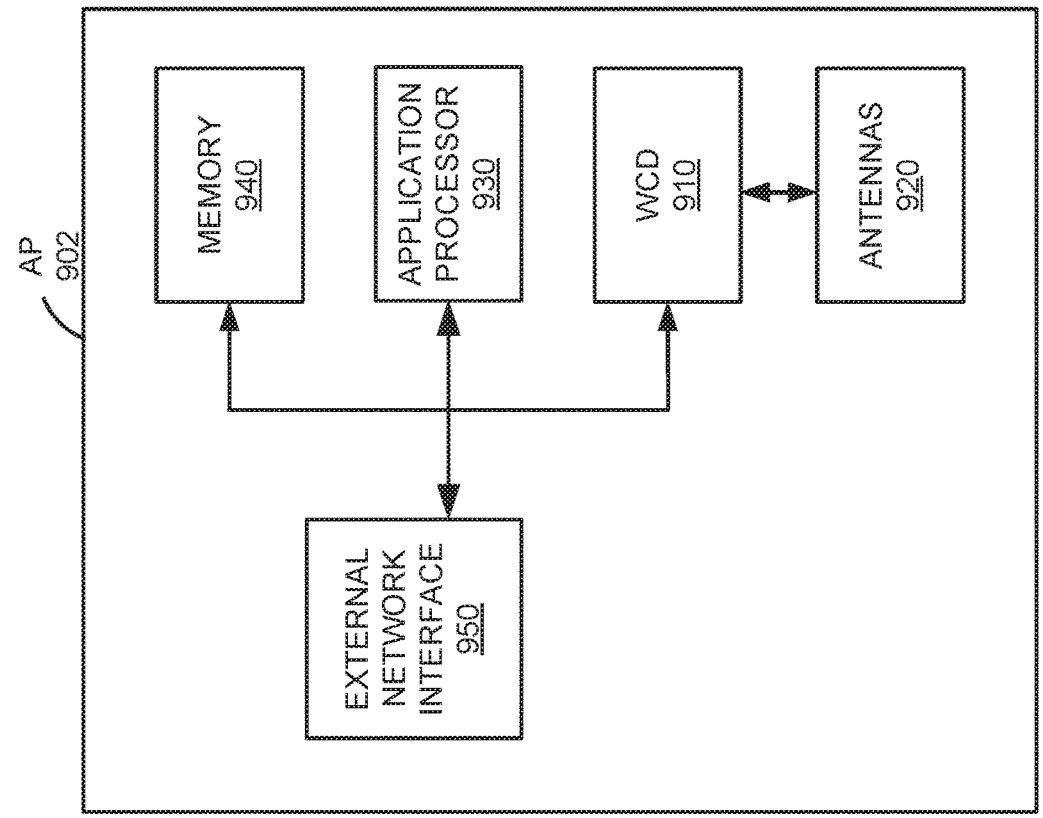
FIG. 9A shows a block diagram of an example AP.

FIG. 9A shows a block diagram of an example AP 902. For example, the AP 902 can be an example implementation of the AP 102 described with reference to FIG. 1. The AP 902 includes a wireless communication device (WCD) 910. For example, the wireless communication device 910 may be an example implementation of the wireless communication device 800 described with reference to FIG. 8. The AP 902 also includes multiple antennas 920 coupled with the wireless communication device 910 to transmit and receive wireless communications. In some implementations, the AP 902 additionally includes an application processor 930 coupled with the wireless communication device 910, and a memory 940 coupled with the application processor 930. The AP 902 further includes at least one external network interface 950 that enables the AP 902 to communicate with a core network or backhaul network to gain access to external networks including the Internet. For example, the external network interface 950 may include one or both of a wired (for example, Ethernet) network interface and a wireless network interface (such as a WWAN interface). Ones of the aforementioned components can communicate with other ones of the components directly or indirectly, over at least one bus. The AP 902 further includes a housing that encompasses the wireless communication device 910, the application processor 930, the memory 940, and at least portions of the antennas 920 and external network interface 950.

FIG. 9B shows a block diagram of an example STA 904. For example, the STA 904 can be an example implementation of the STA 104 described with reference to FIG. 1. The STA 904 includes a wireless communication device 915. For example, the wireless communication device 915 may be an example implementation of the wireless communication device 800 described with reference to FIG. 8. The STA 904 also includes one or more antennas 925 coupled with the wireless communication device 915 to transmit and receive wireless communications. The STA 904 additionally includes an application processor 935 coupled with the wireless communication device 915, and a memory 945 coupled with the application processor 935. In some implementations, the STA 904 further includes a user interface (UI) 955 (such as a touchscreen or keypad) and a display 965, which may be integrated with the UI 955 to form a touchscreen display. In some implementations, the STA 904 may further include one or more sensors 975 such as, for example, one or more inertial sensors, accelerometers, temperature sensors, pressure sensors, or altitude sensors. Ones of the aforementioned components can communicate with other ones of the components directly or indirectly, over at least one bus. The STA 904 further includes a housing that encompasses the wireless communication device 915, the application processor 935, the memory 945, and at least portions of the antennas 925, UI 955, and display 965.

As described above, in a multi-link operation, a retransmission of a frame may use a different communication link than that which was used for an initial transmission of the frame. In the multi-link operation, the multiple communication link may utilize the same temporal key for two or more communication links. Retransmissions of a frame typically include the same PN as the initial transmission. Because multi-link operation typically relies on the same temporal key and the same PN for a retransmission of a frame, the security of the retransmission cannot be uniquely verified and guaranteed unless a change is made to the inputs of the encryption and decryption algorithm.

Various implementations of this disclosure relate generally to multi-link operation. A first WLAN device (such as an AP) may establish one or more communication links with a second WLAN device, including at least a first communication link. The first WLAN device may determine that the second WLAN device (such as a STA) has established a second communication link with either the first WLAN device or with a third WLAN device (such as another AP) of the wireless network. When communicating with the second WLAN device, the first WLAN device may modify an encryption process so that an encryption for the initial transmission and an encryption of a retransmission will result in differently encrypted frames even though the source frame (before encryption) may contain the same data and the encryption technique may use the same temporal key, and same PN. This disclosure provides several implementations of a modified encryption process that supports multi-link operation. Examples of modifications include the use of a link identifier, a direction identifier, and a truncated address segment, among other examples. Another example modified encryption process may rely on sequence numbers for replay attack detection.

Figure 10:
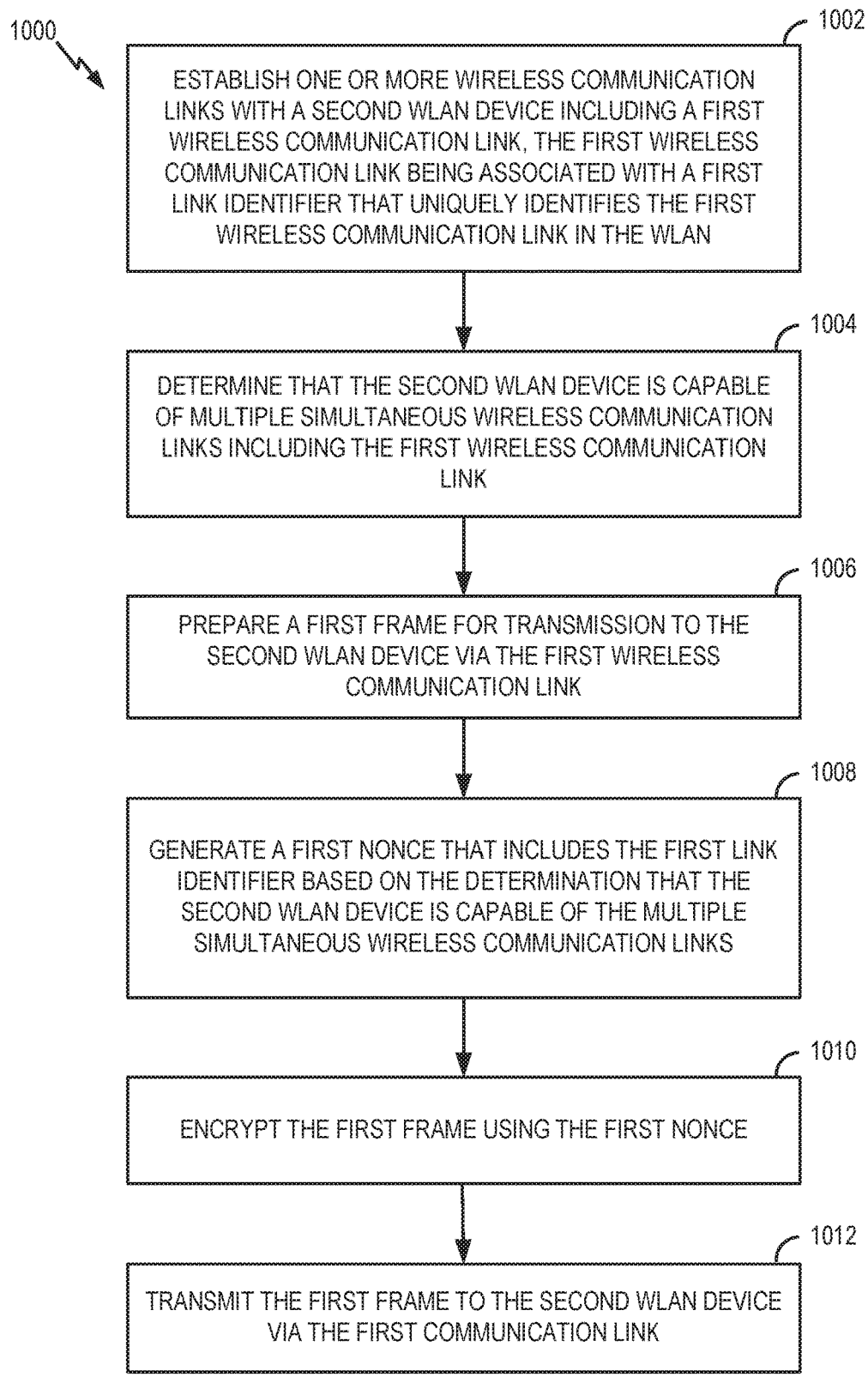
FIG. 10 shows a flowchart illustrating an example process for wireless communication by a first WLAN device of a wireless network according to some implementations.

Particular implementations of the subject matter described in this disclosure can be implemented to realize one or more of the following potential advantages. The described techniques enable improved security for multi-link communications. The security may be enhanced for multi-link operations without modifying the mathematical calculations used in existing encryption and decryption algorithms. For example, an encryption/decryption protocol based on either CCMP or GCMP may continue to use nonces, temporal keys, and PNs for encryption and decryption of frames. In some implementations, the enhanced security may be enabled by manipulating the structure of the nonce without changing the length of the nonce. Furthermore, because some implementations of the improvements are based on changes to a nonce rather than a temporal key, the same temporal key may be used for multiple communication links, which, in turn, enables fast setup, association, and session establishment for multi-link operation. Additionally, existing CCMP or GCMP algorithms may continue to be used, which may reduce complexity in implementing encryption and decryption, while the inputs to the CCMP or GCMP algorithms—particularly the nonce—may provide unique encryption results depending on which communication link is being used to transmit (or retransmit) a frame FIG. 10 shows a flowchart illustrating an example process 1000 for wireless communication by a first WLAN device of a wireless network according to some implementations. The process 1000 may be performed by a wireless communication device such as the wireless communication device 800 described above with reference to FIG. 8. In some implementations, the process 1000 may be performed by a wireless communication device operating as or within an AP, such as one of the APs 102 and 902 described above with reference to FIGS. 1 and 9A, respectively. In some implementations, the process 1000 may be performed by a wireless communication device operating as or within a STA, such as one of the STAs 104 and 904 described above with reference to FIGS. 1 and 9B, respectively.

In some implementations, the process 1000 begins in block 1002 with establishing one or more wireless communication links with a second WLAN device including a first wireless communication link, the first wireless communication link being associated with a first link identifier that uniquely identifies the first wireless communication link in the WLAN.

In block 1004, the process 1000 proceeds with determining that the second WLAN device is capable of multiple simultaneous wireless communication links including the first wireless communication link;

In block 1006, the process 1000 proceeds with preparing a first frame for transmission to the second WLAN device via the first wireless communication link, In block 1008, the process 1000 proceeds with generating a first nonce that includes the first link identifier based on the determination that the second WLAN device is capable of the multiple simultaneous wireless communication links.

In block 1010, the process 1000 proceeds with encrypting the first frame using the first nonce.

In block 1012, the process 1000 proceeds with transmitting the first frame to the second WLAN device via the first communication link.

Figure 11:
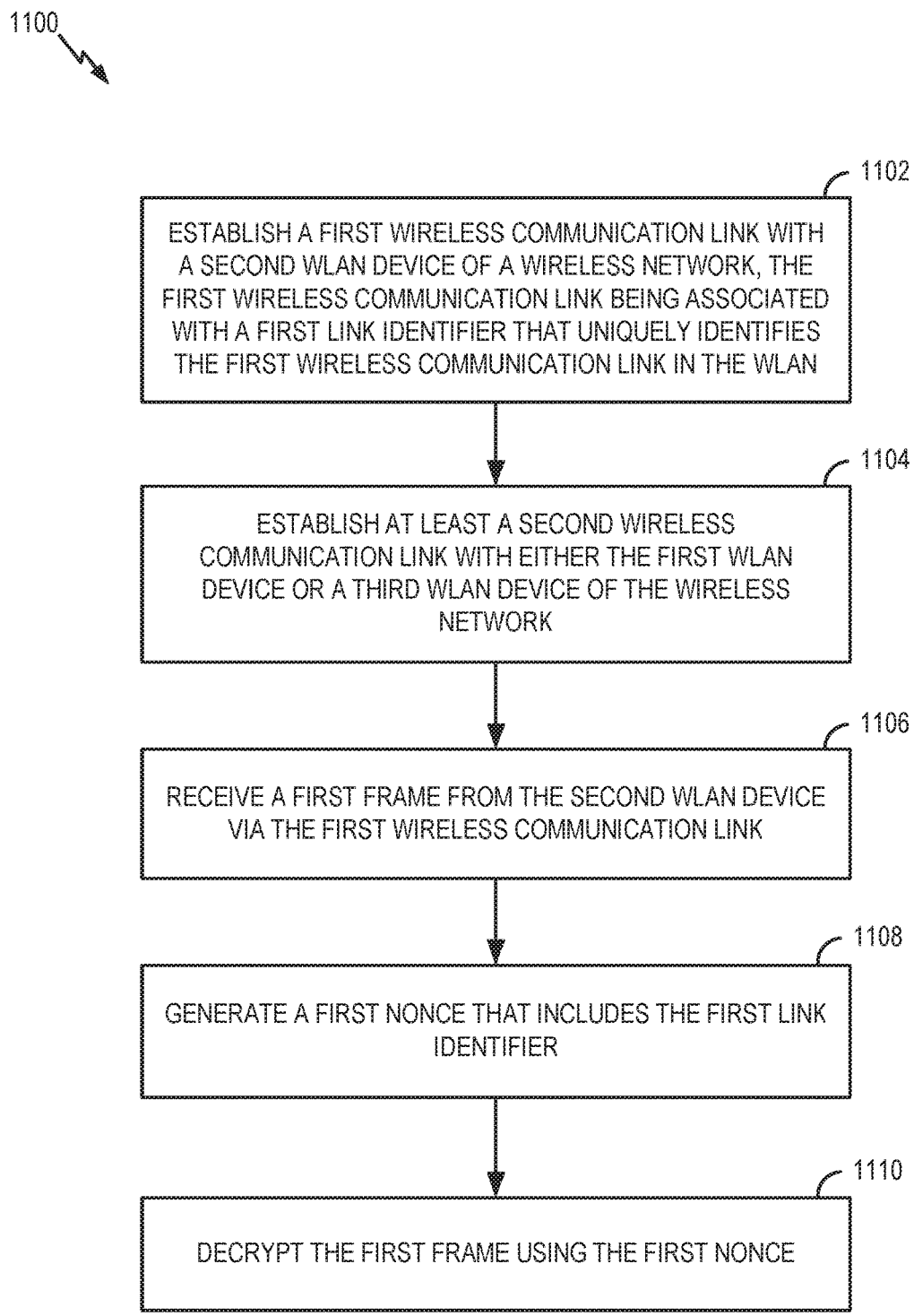
FIG. 11 shows a flowchart illustrating an example process for wireless communication by a second WLAN device of a wireless network according to some implementations.

FIG. 11 shows a flowchart illustrating an example process 1100 for receiving a wireless communication according to some implementations. The process 1100 may be performed by a wireless communication device such as the wireless communication device 800 described above with reference to FIG. 8. In some implementations, the process 1100 may be performed by a wireless communication device operating as or within an AP, such as one of the APs 112 and 902 described above with reference to FIGS. 1 and 9A, respectively. In some implementations, the process 1100 may be performed by a wireless communication device operating as or within a STA, such as one of the STAs 114 and 904 described above with reference to FIGS. 1 and 9B, respectively.

In some implementations, the process 1100 begins in block 1102 with establishing a first wireless communication link with a second WLAN device of a wireless network, the first wireless communication link being associated with a first link identifier that uniquely identifies the first wireless communication link in the WLAN.

In block 1104, the process 1100 proceeds with establishing at least a second wireless communication link with either the first WLAN device or a third WLAN device of the wireless network.

In block 1106, the process 1100 proceeds with receiving a first frame from the second WLAN device via the first wireless communication link.

In block 1108, the process 1100 proceeds with generating a first nonce that includes the first link identifier.

In block 1110, the process 1100 proceeds with decrypting the first frame using the first nonce.

Figure 12:
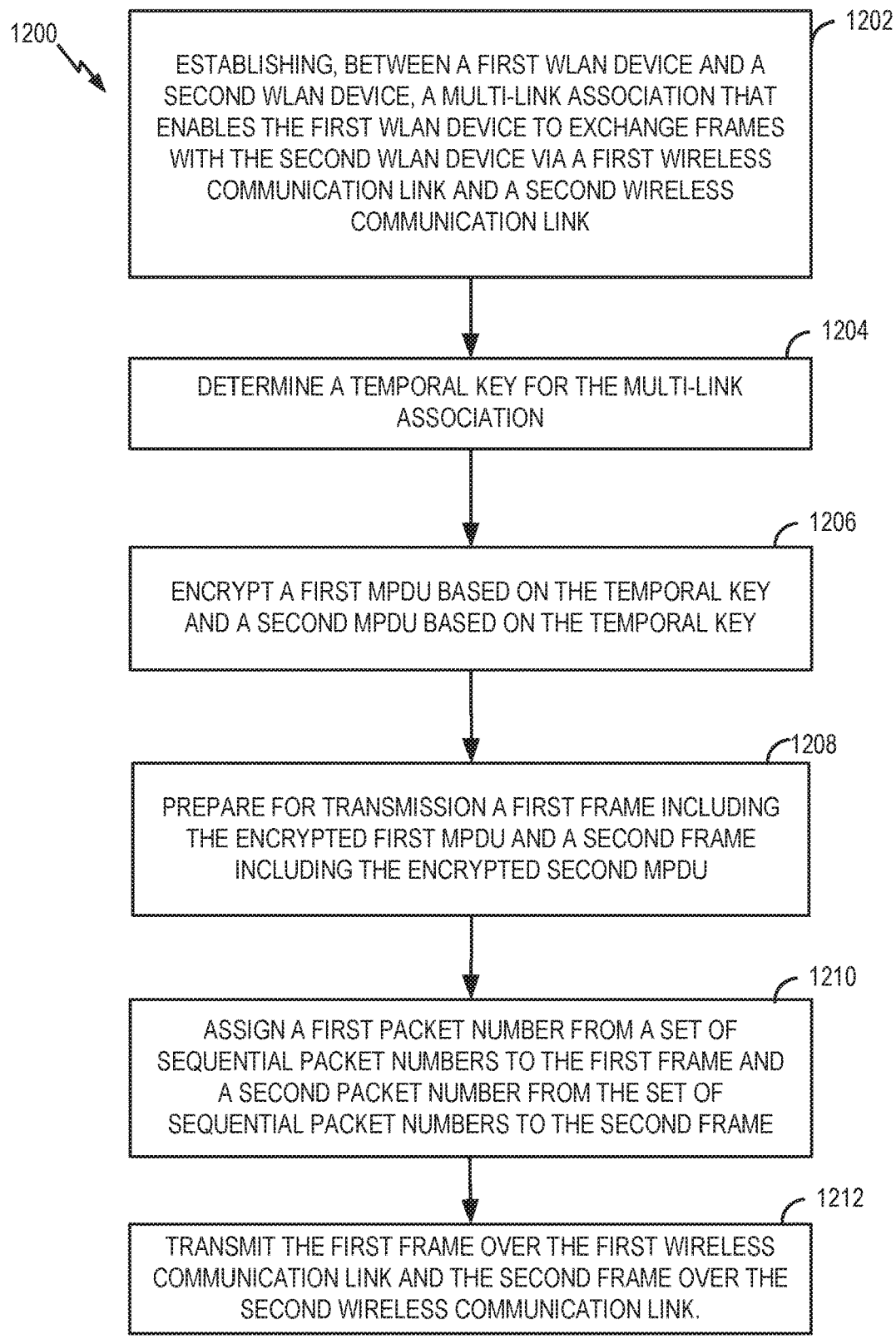
FIG. 12 shows a flowchart illustrating an example process for wireless communication according to some implementations.

FIG. 12 shows a flowchart illustrating an example process 1200 for wireless communication according to some implementations. The process 1200 may be performed by a first WLAN device such as the wireless communication device 800 described above with reference to FIG. 8. In some implementations, the process 1200 may be performed by a wireless communication device operating as or within an AP, such as one of the APs 112 and 902 described above with reference to FIGS. 1 and 9A, respectively. In some implementations, the process 100 may be performed by a wireless communication device operating as or within a STA, such as one of the STAs 114 and 904 described above with reference to FIGS. 1 and 9B, respectively.

In block 1202, the process 1200 establishes, between the first WLAN device and a second WLAN device, a multi-link association that enables the first WLAN device to exchange frames with the second WLAN device via a first wireless communication link and a second wireless communication link.

In block 1204, the process 1200 determines a temporal key for the multi-link association.

In block 1206, the process 1200 encrypts a first MPDU based on the temporal key and a second MPDU based on the temporal key.

In block 1208, the process 1200 prepares for transmission a first frame including the encrypted first MPDU and a second frame including the encrypted second MPDU.

In block 1210, the process 1200 assigns a first packet number from a set of sequential packet numbers to the first frame and a second packet number from the set of sequential packet numbers to the second frame.

In block 1212, the process 1200 transmits the first frame over the first wireless communication link and the second frame over the second wireless communication link.

Figure 13:
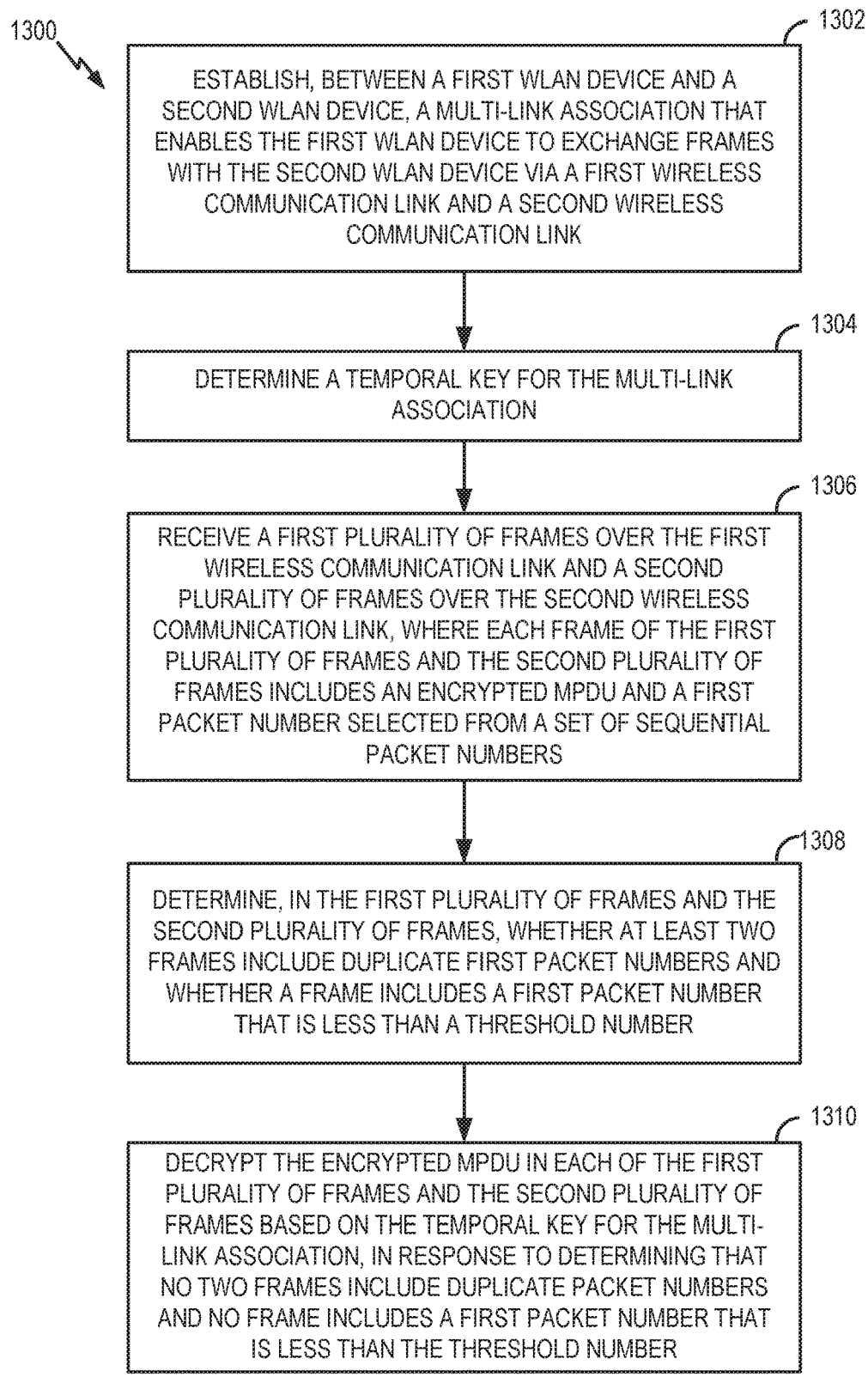
FIG. 13 shows a flowchart illustrating an example process for wireless communication according to some implementations.

FIG. 13 shows a flowchart illustrating an example process 1300 for wireless communication according to some implementations. The process 1300 may be performed by a first WLAN device such as the wireless communication device 800 described above with reference to FIG. 8. In some implementations, the process 1300 may be performed by a wireless communication device operating as or within an AP, such as one of the APs 112 and 902 described above with reference to FIGS. 1 and 9A, respectively. In some implementations, the process 100 may be performed by a wireless communication device operating as or within a STA, such as one of the STAs 114 and 904 described above with reference to FIGS. 1 and 9B, respectively.

At block 1302, the process 1300 establishes, between the first WLAN device and a second WLAN device, a multi-link association that enables the first WLAN device to exchange frames with the second WLAN device via the first wireless communication link and the second wireless communication link.

At block 1304, the process 1300 determines a temporal key for the multi-link association.

At block 1306, the process 1300 receives a first plurality of frames over the first wireless communication link and a second plurality of frames over the second wireless communication link, where each frame of the first plurality of frames and the second plurality of frames includes an encrypted MPDU and a first packet number selected from a set of sequential packet numbers.

At block 1308, the process 1300 determines, in the first plurality of frames and the second plurality of frames, whether at least two frames include duplicate first packet numbers and whether a frame includes a first packet number that is less than a threshold number.

At block 1310, the process 1300 encrypts the encrypted MPDU in each of the first plurality of frames and the second plurality of frames based on the temporal key for the multi-link association, in response to determining that no two frames include duplicate packet numbers and no frame includes a first packet number that is less than the threshold number.

Figure 14:
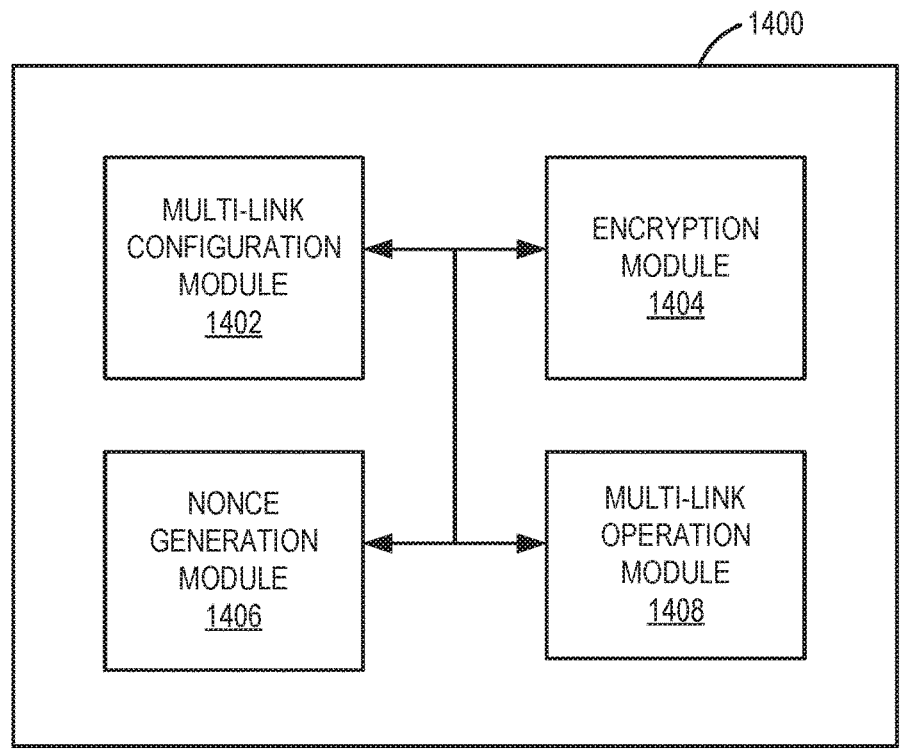
FIG. 14 shows a block diagram of an example wireless communication device according to some implementations.

FIG. 14 shows a block diagram of an example wireless communication device 1400 according to some implementations. In some implementations, the wireless communication device 1400 is configured to perform one or more of the processes described above. The wireless communication device 1400 may be an example implementation of the wireless communication device 800 described above with reference to FIG. 8. For example, the wireless communication device 1400 can be a chip, SoC, chipset, package or device that includes at least one processor and at least one modem (for example, a Wi-Fi (IEEE 802.11) modem or a cellular modem). In some implementations, the wireless communication device 1400 can be a device for use in an AP, such as one of the APs 102 and 902 described above with reference to FIGS. 1 and 9A, respectively. In some implementations, the wireless communication device 1400 can be a device for use in a STA, such as one of the STAs 104 and 904 described above with reference to FIGS. 1 and 9B, respectively. In some other implementations, the wireless communication device 1400 can be an AP or a STA that includes such a chip, SoC, chipset, package or device as well as at least one transmitter, at least one receiver, and at least one antenna.

The wireless communication device 1400 includes a multi-link configuration module 1402, an encryption module 1404, a nonce generation module 1406 and a multi-link operation module 1408. Portions of one or more of the modules 1402, 1404, 1406 and 1408 may be implemented at least in part in hardware or firmware. For example, the multi-link configuration module 1402, the encryption module 1404, the nonce generation module 1406 and the multi-link operation module 1408 may be implemented at least in part by a modem (such as the modem 802). In some implementations, portions of some of the modules 1402, 1404, 1406 or 1408 may be implemented at least in part as software stored in a memory (such as the memory 808). For example, portions of one or more of the modules 1402, 1404, 1406 or 1408 can be implemented as non-transitory instructions (or "code") executable by a processor (such as the processor 806) to perform the functions or operations of the respective module.

The multi-link configuration module 1402 may be configured to determine security configurations for the communication links used in a multi-link operation. For example, the security configurations may include a common temporal key and common PN counter. Alternatively, the security configurations may include different temporal keys and different PN counters for each communication link. The multi-link configuration module 1402 may establish one or more communication links that are part of a group of communication links used for a multi-link operation. As an example, the multi-link operation may include the concurrent use of multiple communication links to transmit MPDUs. The multi-link operation may support aggregation of multiple communication links between different WLAN interfaces (not shown) of the wireless communication device 1400.

The encryption module 1404 may be configured to encrypt an MPDU for transmission via the communication link. The encryption may be based on the security configuration determined by the multi-link configuration module 1402. Additionally, the encryption may be based on a nonce that is made up of at least part of an A2 address value, a PN, and a nonce.

The nonce generation module 1406 may be configured to generate a nonce for the encryption module 1404. In some implementations, the nonce may include at least a first portion that is populated with a link ID. The nonce may include a second portion that is populated with a direction ID.

The multi-link operation module 1408 may be configured to transmit the encrypted MPDUs via the communication links. The multi-link operation module 1408 also may determine that multi-link aggregation is supported by the wireless communication device 1400 and another WLAN device.

Figure 15:
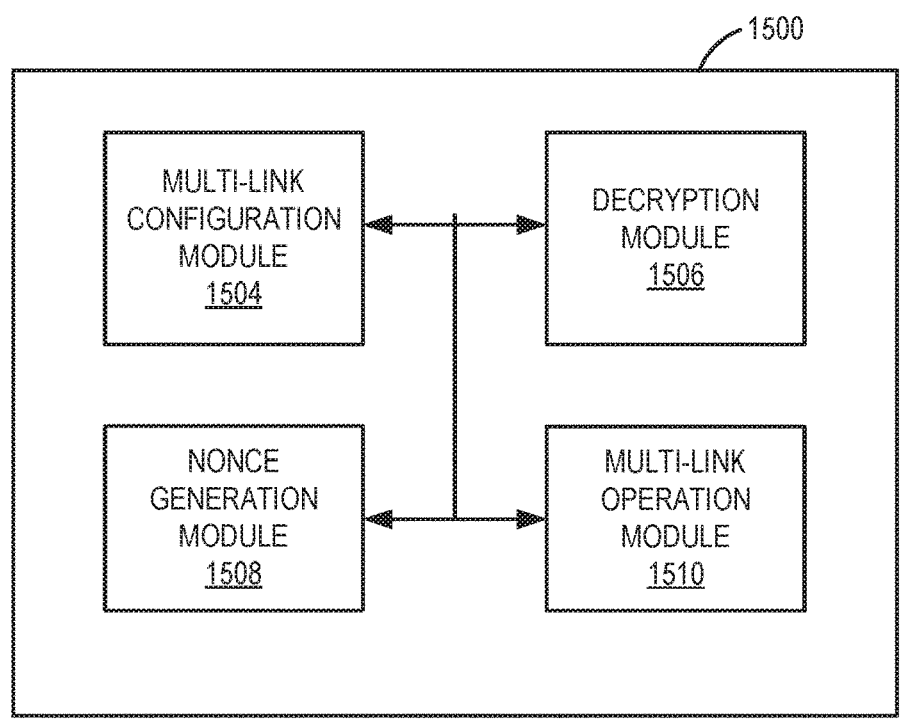
FIG. 15 shows a block diagram of an example wireless communication device according to some implementations.

FIG. 15 shows a block diagram of an example wireless communication device 1500 according to some implementations. In some implementations, the wireless communication device 1500 is configured to perform one or more of the processes described above. The wireless communication device 1500 may be an example implementation of the wireless communication device 800 described above with reference to FIG. 8. For example, the wireless communication device 1500 can be a chip, SoC, chipset, package or device that includes at least one processor and at least one modem (for example, a Wi-Fi (IEEE 802.11) modem or a cellular modem). In some implementations, the wireless communication device 1500 can be a device for use in an AP, such as one of the APs 102 and 902 described above with reference to FIGS. 1 and 9A, respectively. In some implementations, the wireless communication device 1500 can be a device for use in a STA, such as one of the STAs 104 and 904 described above with reference to FIGS. 1 and 9B, respectively. In some other implementations, the wireless communication device 1500 can be an AP or a STA that includes such a chip, SoC, chipset, package or device as well as at least one transmitter, at least one receiver, and at least one antenna.

The wireless communication device 1500 includes a multi-link configuration module 1504, a decryption module 1506, a nonce generation module 1508 and a multi-link operation module 1510. Portions of one or more of the modules 1504, 1506, 1508 and 1510 may be implemented at least in part in hardware or firmware. For example, the multi-link configuration module 1504, the decryption module 1506, the nonce generation module 1508 and the multi-link operation module 1510 may be implemented at least in part by a modem (such as the modem 802). In some implementations, portions of some of the modules 1504, 1506, 1508 or 1510 may be implemented at least in part as software stored in a memory (such as the memory 808). For example, portions of one or more of the modules 1504, 1506, 1508 or 1510 can be implemented as non-transitory instructions (or "code") executable by a processor (such as the processor 806) to perform the functions or operations of the respective module.

The multi-link configuration module 1504 may be configured to determine security configurations for the communication links used in a multi-link operation. For example, the security configurations may include a common temporal key and common PN counter. Alternatively, the security configurations may include different temporal keys and different PN counters for each communication link. The multi-link configuration module 1504 may establish one or more communication links that are part of a group of communication links used for a multi-link operation. As an example, the multi-link operation may include the concurrent use of multiple communication links to receive encrypted MPDUs. The multi-link operation may support aggregation of multiple communication links between different WLAN interfaces (not shown) of the wireless communication device 1500.

The decryption module 1506 may be configured to decrypt an encrypted MPDU received via the communication link. The decryption may be based on the security configuration determined by the multi-link configuration module 1504. Additionally, the encryption may be based on a nonce that is made up of at least part of an A2 address value, a PN, and a nonce.

The nonce generation module 1508 may be configured to generate a nonce for the decryption module 1506. In some implementations, the nonce may include at least a first portion that is populated with a link ID. The nonce may include a second portion that is populated with a direction ID.

The multi-link operation module 1510 may be configured to receive the encrypted MPDUs via the communication links. The multi-link operation module 1510 also may determine that multi-link aggregation is supported by the wireless communication device 1500 and another WLAN device.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a first wireless local area network (WLAN) device, the method comprising:
    establishing, between the first WLAN device and a second WLAN device, a multi-link association that enables the first WLAN device to exchange frames with the second WLAN device via a first link and a second link, respectively;
    assigning a first packet number from a set of sequential packet numbers to a first frame for transmission via the first link;
    assigning a second packet number from the set of sequential packet numbers to a second frame for transmission via the second link that is different from the first link;
    encrypting a first media access control (MAC) protocol data unit (MPDU) based at least in part on a temporal key, wherein the first frame comprises the encrypted first MPDU;
    encrypting a second MPDU based at least in part on the temporal key, wherein the second frame comprises the encrypted second MPDU;
    outputting the first frame for transmission via the first link; and
    outputting the second frame for transmission via the second link.

2. The method of claim 1, further comprising:
    assigning a first sequence number to the first frame and a second sequence number to the second frame, the first sequence number and the second sequence number being from a set of sequence numbers.

3. The method of claim 1, wherein the first link is associated with a first link identifier that identifies the first link and the second link is associated with a second link identifier that identifies the second link.

4. The method of claim 3 further comprising:
    generating a first nonce that includes the first link identifier and a second nonce that includes the second link identifier, wherein encrypting the first MPDU is based at least in part on the first nonce and encrypting the second MPDU is based at least in part on the second nonce.

5. The method of claim 4, wherein generating the first nonce comprises:
    populating a first portion of the first nonce with the first link identifier and populating a second portion of the first nonce with a direction identifier that identifies either an uplink direction or a downlink direction of the first frame.

6. The method of claim 5, wherein generating the first nonce comprises:
    dividing a first address segment of the first nonce to form at least the first portion for the first link identifier and a truncated address segment;
    truncating an address or a basic service set identifier (BSSID) associated with the first WLAN device; and
    populating the truncated address segment of the first nonce with the truncated address or the truncated BSSID.

7. The method of claim 6, wherein a resulting length of the first nonce is equivalent to an original length of the first nonce before dividing the first address segment, and wherein the first nonce includes the first portion, the truncated address segment, and the second portion.

8. The method of claim 6, wherein:
    the truncated address segment includes forty-three bits of the address or the BSSID,
    the first portion includes four bits to identify the first link, and
    the second portion of the first nonce includes one bit to identify either the uplink direction or the downlink direction of the first frame.

9. The method of claim 4, wherein the first nonce includes a first address segment and the second nonce includes a second address segment, the method further comprising:
    populating a first portion of the first address segment with the first link identifier; and
    populating a second portion of the second address segment with the second link identifier.

10. The method of claim 4, wherein generating the first nonce comprises:
    adding or appending the first link identifier to the first nonce.

11. The method of claim 1, further comprising:
    determining to re-output the first frame as a third frame for transmission via the second link;

assigning a third packet number from the set of sequential packet numbers to the third frame, wherein the third packet number is identical to the first packet number of the first frame; and outputting the third frame for transmission to the second WLAN device via the second link.

12. A method for wireless communication by a first wireless local area network (WLAN) device, the method comprising:

establishing, between the first WLAN device and a second WLAN device, a multi-link association that enables the first WLAN device to exchange frames with the second WLAN device via a first link and a second link, respectively;

obtaining a first plurality of frames via the first link, wherein each frame of the first plurality of frames includes an encrypted first media access control (MAC) protocol data unit (MPDU);

obtaining a second plurality of frames via the second link that is different from the first link, wherein each frame of the second plurality of frames includes an encrypted second MPDU, and wherein each frame of the first plurality of frames and each frame of the second plurality of frames includes a packet number selected from a set of sequential packet numbers; and decrypting the encrypted first MPDU in each of the first plurality of frames and the encrypted second MPDU in each of the second plurality of frames based at least in part on a temporal key for the multi-link association, in response to determining that no two frames include duplicate packet numbers and no frame includes a first packet number that is less than a threshold number.

13. The method of claim 12, further comprising:

discarding at least one frame of two frames that include the duplicate packet numbers, in response to detecting the two frames that include the duplicate packet numbers.

14. The method of claim 13, further comprising:

discarding a frame that includes the first packet number that is less than the threshold number, in response to detecting the frame that includes the first packet number that is less than the threshold number.

15. The method of claim 12, wherein each frame of the first plurality of frames and each frame of the second plurality of frames includes a respective sequence number selected from a set of sequence numbers, the method further comprising:

ordering the first plurality of frames and the second plurality of frames according to the respective sequence number.

16. The method of claim 12, further comprising:

obtaining a re-output frame associated with a frame of the first plurality of frames via the second link, wherein the re-output frame includes a second packet number identical to a third packet number included in the frame of the first plurality of frames.

17. The method of claim 16, wherein the re-output frame includes an MPDU encrypted based at least in part on the temporal key for the multi-link association.

18. The method of claim 16, wherein the re-output frame includes a first sequence number identical to a second sequence number included in the frame of the first plurality of frames.

19. The method of claim 12, further comprising:

generating a first nonce that includes a first link identifier associated with the first link and a second nonce that includes a second link identifier associated with the second link, wherein decrypting each encrypted first MPDU of the first plurality of frames is further based at least in part on the first nonce, and wherein decrypting each encrypted second MPDU of the second plurality of frames is further based at least in part on the second nonce.

20. A first apparatus for wireless communications, comprising:

at least one processor; and memory comprising instructions executable by the at least one processor to cause the first apparatus to:

establish, between the first apparatus and a second apparatus, a multi-link association that enables the first apparatus to exchange frames with the second apparatus via a first link and a second link, respectively;

assign a first packet number from a set of sequential packet numbers to a first frame for transmission via the first link;

assign a second packet number from the set of sequential packet numbers to a second frame for transmission via the second link that is different from the first link;

encrypt a first media access control (MAC) protocol data unit (MPDU) based at least in part on a temporal key, wherein the first frame comprises the encrypted first MPDU;

encrypt a second MPDU based at least in part on the temporal key, wherein the second frame comprises the encrypted second MPDU;

output the first frame for transmission via the first link; and output the second frame for transmission via the second link.

21. The first WLAN device apparatus of claim 20, wherein the instructions are further executable by the at least one processor to cause the first apparatus to:

assign a first sequence number to the first frame and a second sequence number to the second frame, the first sequence number and the second sequence number being from a set of sequence numbers.

22. The first apparatus of claim 20, wherein the first link is associated with a first link identifier that identifies the first link and the second link is associated with a second link identifier that identifies the second link.

23. The first apparatus of claim 22, wherein the instructions are further executable by the at least one processor to cause the first apparatus to:

generate a first nonce that includes the first link identifier and a second nonce that includes the second link identifier, wherein encryption of the first MPDU is based at least in part on the first nonce, and encryption of the second MPDU further is based at least in part on the second nonce.

24. The first WLAN device apparatus of claim 23, wherein generating the first nonce comprises:

insertion of the first link identifier into a first portion of the first nonce; and insertion of a direction identifier into a second portion of the first nonce, wherein the direction identifier identifies either an uplink direction or a downlink direction of the first frame.

25. The first apparatus of claim 24, wherein generating the first nonce further comprises:

division of a first address segment of the first nonce to form at least the first portion for the first link identifier and a truncated address segment;

truncation of an address or a basic service set identifier (BSSID) associated with the first apparatus; and population of the truncated address segment of the first nonce with the truncated address or the truncated BSSID.

26. The first apparatus of claim 20, wherein encrypting the first MPDU is further based at least in part on the first packet number and encrypting the second MPDU is further based at least in part on the second packet number.

27. The first apparatus of claim 20, further comprising a transceiver, wherein the first apparatus is a wireless local area network (WLAN) device and the instructions are further executable by the at least one processor to cause the WLAN device to:

transmit, via the transceiver, the first frame via the first link; and transmit, via the transceiver, the second frame via the second link.

28. A first apparatus for wireless communications, comprising, comprising:

at least one processor; and memory comprising instructions executable by the at least one processor to cause the first apparatus to:

establish, between the first apparatus and a second apparatus, a multi-link association that enables the first apparatus to exchange frames with the second apparatus via a first link and a second link, respectively;

obtain a first plurality of frames via the first link, wherein each frame of the first plurality of frames includes an encrypted first media access control (MAC) protocol data unit (MPDU);

obtain a second plurality of frames via the second link that is different from the first link, wherein each frame of the second plurality of frames includes an encrypted second MPDU, and wherein each frame of the first plurality of frames and each frame of the second plurality of frames includes a packet number selected from a set of sequential packet numbers; and decrypt the encrypted first MPDU in each of the first plurality of frames and the encrypted second MPDU in each of the second plurality of frames based at least in part on a temporal key for the multi-link association, in response to a determination that no two frames include duplicate packet numbers and no frame includes a first packet number that is less than a threshold number.

29. The first apparatus of claim 28, wherein the instructions are further executable by the at least one processor to cause the first apparatus to:

discard at least one frame of two frames that include the duplicate packet numbers, in response to detection of the two frames that include the duplicate packet numbers.

30. The first apparatus of claim 28, wherein the instructions are further executable by the at least one processor to cause the first apparatus to:

discard a frame that includes the first packet number that is less than the threshold number in response to detecting the frame that includes the first packet number that is less than the threshold number.

31. The first apparatus of claim 28, wherein the instructions are further executable by the at least one processor to cause the first apparatus to:

obtain a re-output frame associated with a frame of the first plurality of frames via the second link, wherein the re-output frame includes a second packet number identical to a third packet number included in the frame of the first plurality of frames.

* * * * *